(12) United States Patent
Budagavi

(10) Patent No.: US 11,995,147 B2
(45) Date of Patent: May 28, 2024

(54) UNIFIED FORWARD AND INVERSE TRANSFORM ARCHITECTURE

(71) Applicant: Texas Instruments Incorporated, Dallas, TX (US)

(72) Inventor: Madhukar Budagavi, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 135 days.

(21) Appl. No.: 17/460,802

(22) Filed: Aug. 30, 2021

(65) Prior Publication Data

US 2021/0390157 A1 Dec. 16, 2021

Related U.S. Application Data

(63) Continuation of application No. 16/830,673, filed on Mar. 26, 2020, now Pat. No. 11,163,852, which is a continuation of application No. 13/668,289, filed on Nov. 4, 2012, now Pat. No. 10,642,921.

(60) Provisional application No. 61/559,908, filed on Nov. 15, 2011, provisional application No. 61/555,364, filed on Nov. 3, 2011.

(51) Int. Cl.
*G06F 17/14* (2006.01)
*H04N 19/60* (2014.01)
*H04N 19/61* (2014.01)

(52) U.S. Cl.
CPC ........... *G06F 17/147* (2013.01); *H04N 19/60* (2014.11); *H04N 19/61* (2014.11)

(58) Field of Classification Search
CPC . G06F 17/14–148; H04N 19/60; H04N 19/61

USPC .................................................. 708/400–410
See application file for complete search history.

(56) References Cited

U.S. PATENT DOCUMENTS

| | | | |
|---|---|---|---|
| 5,257,213 A | 10/1993 | Kim et al. | |
| 5,361,220 A | 11/1994 | Asano | |
| 5,452,466 A | 9/1995 | Fettweis | |
| 5,598,361 A | 1/1997 | Nagamatsu et al. | |
| 6,587,590 B1 | 7/2003 | Pan | |
| 9,824,066 B2 * | 11/2017 | Joshi ..................... | G06F 17/147 |
| 2011/0150079 A1 | 6/2011 | Reznik et al. | |

OTHER PUBLICATIONS

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-229, Jul. 14-22, 2011, Torino, Italy.

(Continued)

*Primary Examiner* — Emily E Larocque
(74) *Attorney, Agent, or Firm* — Carl G. Peterson; Frank D. Cimino

(57) ABSTRACT

Multiple transform sizes improve video coding efficiency, but also increase the implementation complexity. Furthermore, both forward and inverse transforms need to be supported in various consumer devices. Embodiments provide a unified forward and inverse transform architecture that supports computation of both forward and inverse transforms for multiple transforms sizes using shared hardware circuits. The unified architecture exploits the symmetry properties of forward and inverse transform matrices to achieve hardware sharing across different the transform sizes and also between forward and inverse transform computations.

20 Claims, 16 Drawing Sheets

(56) References Cited

OTHER PUBLICATIONS

A. Fuldseth et al, "CE10: Core Transform Design for HEVC", JCTVC-F446, Joint Collaborative Team on Video Coding (JCT-VC) of ITU-T SG16 WP3 and ISO/IEC JTC1/SC29/WG11, pp. 1-13, Jul. 14-22, 2011, Torino, Italy.

Madhukar Budagavi et al, "Hardware Analysis of Transform and Quantization", JCTVC-G132, Joint Collaborative Team on Video Coding (JCT-VC) of ITU-T SG16 WP3 and ISO/IEC JTC1/SC29/WG11, pp. 1-6, Nov. 21-30, 2011, Geneva, Switzerland.

Mehul Tikekar et al, "Core Transform Property for Practical Throughput Hardware Design", JCTVC-G265, Joint Collaborative Team on Video Coding (JCT-VC) of ITU-T SG16 WP3 and ISO/IEC JTC1/SC29/WG11, pp. 1-3, Nov. 21-30, 2011, Geneva, Switzerland.

Mehul Tikekar et al, "Core Transform Property for Practical Throughput Hardware Design", JCTVC-G265 presentation, Joint Collaborative Team on Video Coding (JCT-VC) of ITU-T SG16 WP3 and ISO/IEC JTC1/SC29/WG11, pp. 1-7, Nov. 21-30, 2011, Geneva, Switzerland.

A. Fuldseth et al, "CE10: Core Transform Design for HEVC", JCTVC-G495, Joint Collaborative Team on Video Coding (JCT-VC) of ITU-T SG16 WP3 and ISO/IEC JTC1/SC29/WG11, pp. 1-10, Nov. 21-30, 2011, Geneva, Switzerland.

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/WG11, pp. 1-215, Mar. 16-23, 2011, Geneva, Switzerland.

Ankur Saxena and Felix C. Fernandes, "CE7: Mode-Dependent DCT/DST Without 4*4 Full Matrix Multiplication for Intra Prediction", JCTVC-E125, Joint Collaborative Team on Video Coding (JCT-VC) of ITU-T SG16 WP3 and ISO/IEC JTC1/SC29/WG11, pp. 1-10, Mar. 16-23, 2011, Geneva, Switzerland.

Mangesh Sadafale and Madhukar Budagavi, "Low-Complexity, Configurable Transform Architecture for HEVC", JCTVC-C226 presentation, Joint Collaborative Team on Video Coding (JCT-VC) of ITU-T SG16 WP3 and ISO/IEC JTC1/SC29/WG11, pp. 1-17, Oct. 7-15, 2010, Guangzhou, China.

S. Indumathi and Dr. M. Sailaja, "Optimization of ECAT through DA-DCT", IOSR Journal of Electronics and Communication Engineering (IOSRJECE), vol. 3, Issue 1, pp. 39-50, Sep.-Oct. 2012.

Ching-Yu Hung and Paul Landman, "Compact Inverse Discrete Cosine Transform Circuit for MPEG Video Decoding", 1997 IEEE Workshop on Signal Processing Systems, SIPS 97—Design and Implementation, pp. 364-373, Nov. 3-5, 1997, Leicester, UK.

Henrique S. Malvar et al, "Low-Complexity Transform and Quantization in H.264/AVC", IEEE Transactions on Circuits and Systems for Video Technology, vol. 13, No. 7, pp. 598-603, Jul. 2003.

Benjamin Bross et al, High Efficiency Video Coding (HEVC) Text Specification Draft 7, JCTVC-I1003_d1, Joint Collaborative Team on Video Coding (JCT-VC) of ITU-T SG16 WP3 and ISO/IEC JTC1/SC29/WG11, pp. 1-272, Apr. 27-May 7, 2012, Geneva, Switzerland.

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-260, Jul. 11-20, 2012, Stockholm, Sweden.

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, pp. 1-237, Nov. 21-30, 2011, Geneva, Switzerland.

Benjamin Bross et al, High Efficiency Video Coding (HEVC) Text Specification Draft 6, JCTVC-H1003, Joint Collaborative Team on Video Coding (JCT-VC) of ITU-T SG16 WP3 and ISO/IEC JTC1/SC29/WG11, pp. 1-259, Nov. 21-30, 2011, Geneva, Switzerland.

Mangesh Sadafale and Madhukar Budagavi, "Low-Complexity, Configurable Transform Architecture for HEVC", JCTVC-C226, Joint Collaborative Team on Video Coding (JCT-VC) of ITU-T SG16 WP3 and ISO/IEC JTC1/SC29/WG11, pp. 1-5, Oct. 7-15, 2010, Guangzhou, China.

Madhukar Budagavi et al, "Hardware Analysis of Transform and Quantization", JCTVC-G132 presentation, Joint Collaborative Team on Video Coding (JCT-VC) of ITU-T SG16 WP3 and ISO/IEC JTC1/SC29/WG11, pp. 1-14, Nov. 21-30, 2011, Geneva, Switzerland.

* cited by examiner

$$\begin{bmatrix} P0 \\ P1 \\ P2 \\ P3 \end{bmatrix} = \begin{bmatrix} C16 & C16 & C16 & C16 \\ C8 & C24 & -C24 & -C8 \\ C16 & -C16 & -C16 & C16 \\ C24 & -C8 & C8 & -C24 \end{bmatrix} \begin{bmatrix} M0 \\ M1 \\ M2 \\ M3 \end{bmatrix} \Rightarrow \begin{cases} \begin{bmatrix} K0 \\ K1 \\ K2 \\ K3 \end{bmatrix} = \begin{bmatrix} M0+M3 \\ M1+M2 \\ -M1+M2 \\ -M0+M3 \end{bmatrix} \\ \\ \begin{bmatrix} P0 \\ P2 \end{bmatrix} = \begin{bmatrix} C16 & C16 \\ -C16 & -C16 \end{bmatrix} \begin{bmatrix} K0 \\ K1 \end{bmatrix} \\ \text{EVEN} \\ \\ \begin{bmatrix} P1 \\ P3 \end{bmatrix} = \begin{bmatrix} -C24 & -C8 \\ -C8 & -C24 \end{bmatrix} \begin{bmatrix} K2 \\ K3 \end{bmatrix} \\ \text{ODD} \end{cases}$$

FIG. 2

$$\begin{bmatrix} Y0 \\ Y1 \\ Y2 \\ Y3 \end{bmatrix} = \begin{bmatrix} C16 & C8 & C16 & C24 \\ C16 & C24 & -C16 & -C8 \\ C16 & -C24 & -C16 & C8 \\ C16 & -C8 & C16 & -C24 \end{bmatrix} \begin{bmatrix} X0 \\ X1 \\ X2 \\ X3 \end{bmatrix} \Rightarrow \begin{cases} \begin{bmatrix} Z0 \\ Z1 \end{bmatrix} = \begin{bmatrix} C16 & C16 \\ C16 & -C16 \end{bmatrix} \begin{bmatrix} X0 \\ X2 \end{bmatrix} \\ \text{EVEN} \\ \\ \begin{bmatrix} Z2 \\ Z3 \end{bmatrix} = \begin{bmatrix} -C24 & C8 \\ -C8 & -C24 \end{bmatrix} \begin{bmatrix} X1 \\ X3 \end{bmatrix} \\ \text{ODD} \\ \\ \begin{bmatrix} Y0 \\ Y1 \\ Y2 \\ Y3 \end{bmatrix} = \begin{bmatrix} Z0-Z3 \\ Z1-Z2 \\ Z1+Z2 \\ Z0+Z3 \end{bmatrix} \end{cases}$$

$$\begin{bmatrix} Z0 \\ Z1 \\ Z2 \\ Z3 \end{bmatrix} = \begin{bmatrix} C16 & C8 & C16 & C24 \\ C16 & C24 & C16 & -C8 \\ C16 & -C24 & -C16 & C8 \\ C16 & -C8 & C16 & -C24 \end{bmatrix} \begin{bmatrix} X0 \\ X2 \\ X4 \\ X6 \end{bmatrix}$$

EVEN $$\begin{bmatrix} Z4 \\ Z5 \\ Z6 \\ Z7 \end{bmatrix} = \begin{bmatrix} -C28 & C20 & -C12 & C4 \\ -C20 & C4 & -C28 & -C12 \\ -C12 & C28 & C4 & C20 \\ C4 & -C12 & -C20 & -C28 \end{bmatrix} \begin{bmatrix} X1 \\ X3 \\ X5 \\ X7 \end{bmatrix}$$

ODD $$\begin{bmatrix} Y0 \\ Y1 \\ Y2 \\ Y3 \\ Y4 \\ Y5 \\ Y6 \\ Y7 \end{bmatrix} = \begin{bmatrix} Z0 - Z7 \\ Z1 - Z6 \\ Z2 - Z5 \\ Z3 - Z4 \\ Z3 + Z4 \\ Z2 + Z5 \\ Z1 + Z6 \\ Z0 + Z7 \end{bmatrix}$$

⇑

$$\begin{bmatrix} Y0 \\ Y1 \\ Y2 \\ Y3 \\ Y4 \\ Y5 \\ Y6 \\ Y7 \end{bmatrix} = \begin{bmatrix} C16 & C4 & C8 & C12 & C16 & C20 & C24 & C28 \\ C16 & C12 & C24 & -C28 & -C16 & -C4 & -C8 & -C20 \\ C16 & C20 & -C24 & -C4 & -C16 & C28 & C8 & C12 \\ C16 & C28 & -C8 & -C20 & C16 & C12 & -C24 & -C4 \\ C16 & -C28 & -C8 & C20 & C16 & -C12 & -C24 & C4 \\ C16 & -C20 & -C24 & C4 & -C16 & -C28 & C8 & -C12 \\ C16 & -C12 & C24 & C28 & -C16 & C4 & -C8 & C20 \\ C16 & -C4 & C8 & -C12 & C16 & -C20 & C24 & -C28 \end{bmatrix} \begin{bmatrix} X0 \\ X1 \\ X2 \\ X3 \\ X4 \\ X5 \\ X6 \\ X7 \end{bmatrix}$$

FIG. 10

UNIFIED FORWARD AND INVERSE TRANSFORM ARCHITECTURE

CROSS-REFERENCE TO RELATED APPLICATIONS

This application is a continuation of U.S. patent application Ser. No. 16/830,673, filed Mar. 26, 2020, which is a continuation of U.S. patent application Ser. No. 13/668,289 filed Nov. 4, 2012 (now U.S. Pat. No. 10,642,921), which claims benefit of U.S. Provisional Patent Application Ser. No. 61/555,364 filed Nov. 3, 2011, and U.S. Provisional Patent Application Ser. No. 61/559,908 filed Nov. 15, 2011, which are incorporated herein by reference in their entirety.

BACKGROUND OF THE INVENTION

Field of the Invention

Embodiments of the present invention generally relate to a unified forward and inverse transform architecture for video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). HEVC is expected to provide around 50% reduction in bitrate (at similar visual quality) over the current standard, H.264/AVC, and intended to support larger resolutions and higher frame rates. To address these requirements, HEVC utilizes larger block sizes than H.264/AVC. In HEVC, the largest coding unit (LCU) can be up to 64×64 in size and support for transform sizes of 4×4, 8×8, 16×16, 32×32, 16×4, 4×16, 32×8, and 8×32 is proposed. Multiple transform sizes improve compression performance, but also increase implementation complexity.

Products such as camera phones, tablets, video-conferencing systems, and set-top boxes with digital video recording features typically implement both video capture and video playback. Thus, video encoding and decoding are both implemented in such products, which requires the implementation of both forward and inverse transforms in the same device. Accordingly, reduction of the overall area of the hardware block that implements forward and reverse transforms is desirable.

SUMMARY

Embodiments of the present invention relate to apparatus and methods for unified forward and inverse transform computation. In one aspect, an apparatus for computation of forward and inverse transforms is provided that includes a first decomposition circuit configured to receive an N-point input vector, wherein the first decomposition circuit is operable to decompose the N-point input vector to form a first (N/2)-point vector and a second (N/2)-point vector, wherein, in response to a control signal, the first (N/2)-point vector and the second (N/2)-point vector are inputs for an N-point forward transform computation or inputs for an N-point inverse transform computation, a first matrix multiplication circuit coupled to the first decomposition circuit to receive the second (N/2)-point vector, a forward and inverse (N/2)-point transform computation circuit coupled to the first decomposition circuit to receive the first (N/2)-point vector, a first recomposition circuit coupled to receive a first (N/2)-point output vector from the first matrix multiplication circuit and a second (N/2)-point output vector from the forward and inverse (N/2)-point transform computation circuit, wherein the first recomposition circuit is operable to compose an N-point output vector from the first (N/2)-point output vector and the second (N/2)-point output vector, wherein, in response to the control signal, the N-point output vector is an output of the N-point forward transform computation or an output of the N-point inverse transform computation, wherein the first matrix multiplication circuit is configured to multiply an (N/2)-point vector with an (N/2)×(N/2) matrix, the (N/2)×(N/2) matrix consisting of elements from odd lines of an N×N transform coefficient matrix, and wherein the forward and inverse (N/2)-point transform computation circuit is configured to compute an (N/2)-point forward transform or an (N/2)-point inverse transform responsive to the control signal.

In one aspect, a method for computation of forward and inverse N-point transforms is provided that includes receiving a control signal, wherein the control signal indicates where a forward transform or an inverse transform is to be computed, receiving an N-point input vector in a first decomposition circuit, wherein the first decomposition circuit is operable to decompose the N-point input vector to form a first (N/2)-point vector and a second (N/2)-point vector, wherein, in response to the control signal, the first (N/2)-point vector and the second (N/2)-point vector are inputs for an N-point forward transform computation or inputs for an N-point inverse transform computation, performing matrix multiplication of the second (N/2)-point vector with an (N/2)×(N/2) matrix in a first matrix multiplication circuit, the first matrix multiplication circuit coupled to the first decomposition circuit to receive the second (N/2)-point vector, wherein the (N/2)×(N/2) matrix consists of elements from odd lines of an N×N transform coefficient matrix, computing an (N/2)-point transform of the first (N/2)-point vector in a forward and inverse (N/2)-point transform computation circuit coupled to the first decomposition circuit to receive the first (N/2)-point vector, wherein the forward and inverse (N/2)-point transform computation circuit is operable to compute an (N/2)-point forward transform or an (N/2)-point inverse transform responsive to the control signal, and composing an N-point output vector in a first recomposition circuit, the first recomposition circuit coupled to receive a first (N/2)-point output vector from the first matrix multiplication circuit and a second (N/2)-point output vector from the forward and inverse (N/2)-point transform computation circuit, wherein the first recomposition circuit is operable to compose the N-point output vector from the first (N/2)-point output vector and the second (N/2)-point output vector, wherein, in response to the control signal, the N-point output vector is an output of the N-point forward transform computation or an output of the N-point inverse transform computation.

BRIEF DESCRIPTION OF THE DRAWINGS

Particular embodiments will now be described, by way of example only, and with reference to the accompanying drawings:

FIGS. 1A-1C illustrate symmetry of transform matrices;

FIG. 2 illustrates even-odd decomposition of the forward 4-pt transform;

FIG. 3 illustrates even-odd decomposition of the inverse 4-pt transform;

FIG. 8 illustrates even-odd decomposition of the forward 8-pt transform;

FIG. 10 illustrates even-odd decomposition of the inverse 8-pt transform;

DETAILED DESCRIPTION OF EMBODIMENTS OF THE INVENTION

Figure 4A:
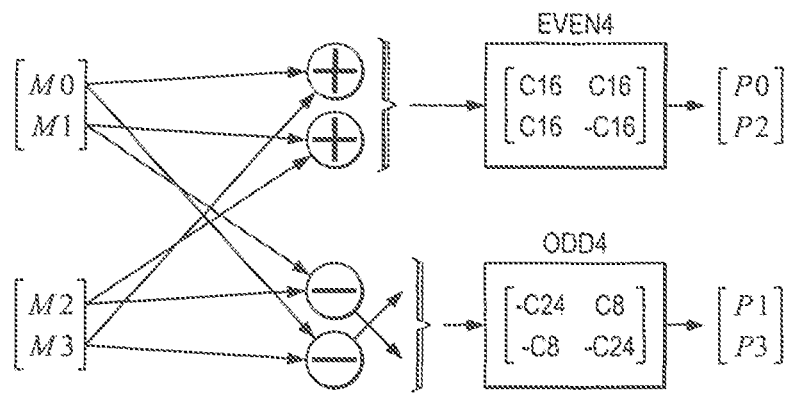
FIGS. 4a and 4B show architectures of, respectively, the forward 4-pt transform implementation and the inverse 4-pt transform implementation using even-odd decomposition.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments of the invention are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit. In recent specifications, the size of a square transform unit may be 4×4, 8×8, 16×16, and 32×32 and the size of a non-square transform may be 16×4, 4×16, 32×8, and 8×32. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003, Joint Collaborative Team on Video Coding (JCT-VC) of ITU-T SG16 WP3 and ISO/IEC JTC1/SC29/WG1, Geneva, CH, Nov. 21-30, 2011 ("HEVC Draft 6"), B. Bross, et al., "High Efficiency Video Coding (HEVC) Text Specification Draft 7," JCTVC-I1003_d0, Joint Collaborative Team on Video Coding (JCT-VC) of ITU-T SG16 WP3 and ISO/IEC JTC1/SC29/WG1, Geneva, CH, April 17-May 7, 2012 ("HEVC Draft 7"), and B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8").

Some aspects of this disclosure have been presented to the JCT-VC in M. Budagavi, "Hardware Analysis of Transform and Quantization," JCTVC-G132, Joint Collaborative Team on Video Coding (JCT-VC) of ITU-T SG16 WP3 and ISO/IEC JTC1/SC29/WG11, Geneva, CH, Nov. 21-30, 2011, which is incorporated by reference herein in its entirety.

Embodiments of the invention provide an architecture for joint computation of forward and inverse transforms. More specifically, an architecture is provided that exploits the symmetry properties of the core transform in HEVC and may be used to reduce the overall chip area needed for implementation of forward and inverse transforms. A general description of the core transform is provided herein. Additional detail may be found, for example, in A. Fuldseth, "CE10: Core Transform Design for HEVC," JCTVC-G495, Joint Collaborative Team on Video Coding (JCT-VC) of ITU-T SG16 WP3 and ISO/IEC JTC1/SC29/WG11, Geneva, CH, Nov. 21-30, 2011.

The core transform specified in HEVC is a DCT-like integer transform that can be represented by matrix multiplication. Unlike the H.264/AVC transform, the HEVC core transform has decoupled transform and quantization. The M×N core transforms can be implemented as M-point (M-pt) 1D transforms followed by N-pt 1D transforms. Both square and rectangular transforms can share the same 1D transform hardware. The 32-pt HEVC core transform matrix is defined by thirty-one 8-bit constants (ignoring sign bits)—C1, C2, . . . , C31—given by:

C1=90, C2=90, C3=90, C4=89, C5=88,
C6=87, C7=85, C8=83, C9=82, C10=80,
C11=78, C12=75, C13=73, C14=70, C15=67,
C16=64, C17=61, C18=57, C19=54, C20=50,
C21=46, C22=43, C23=38, C24=36, C25=31,
C26=25, C27=22, C28=18, C29=13, C30=9,
C31=4.

Figures 1A, 1B, 1C:
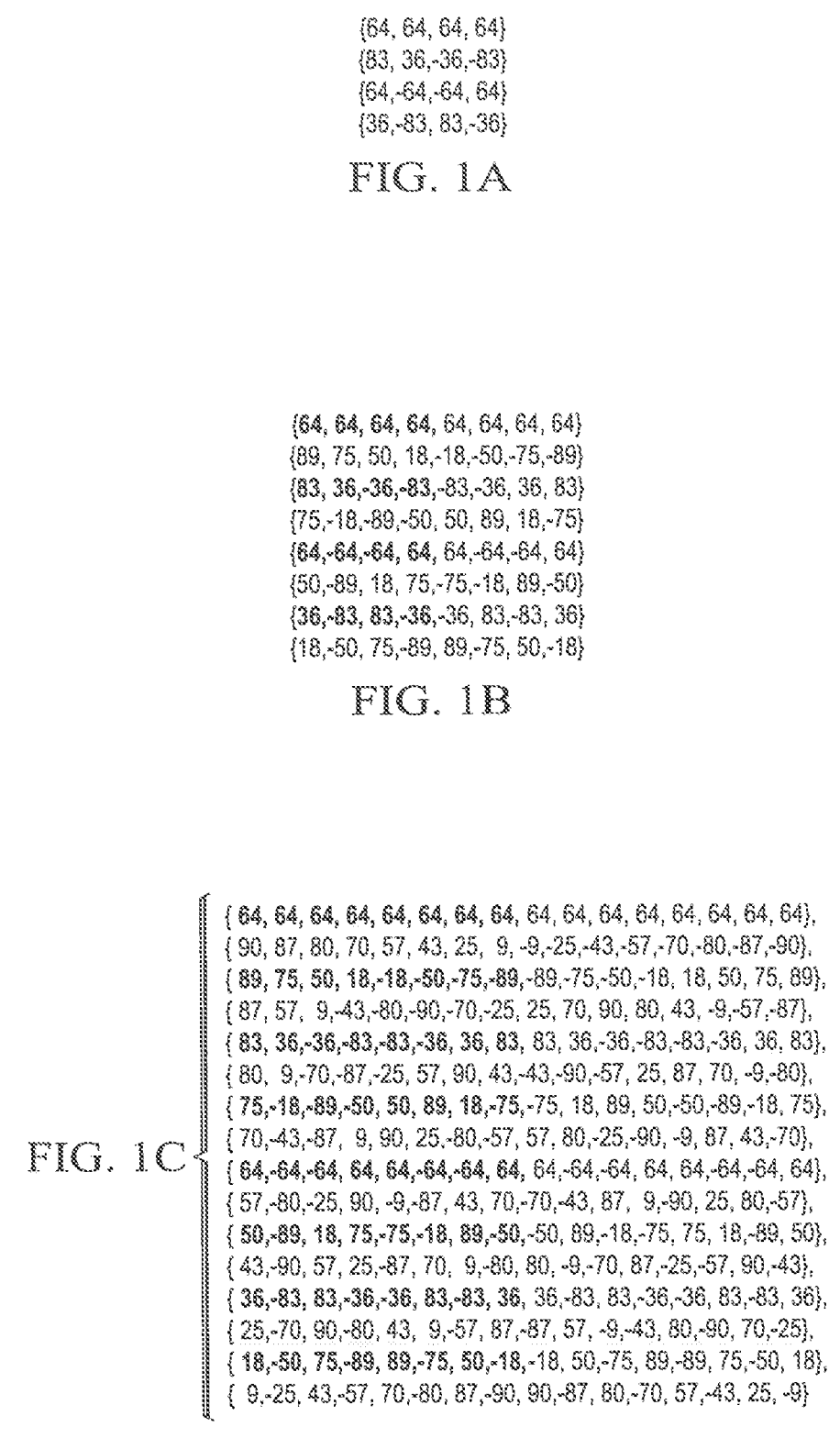

This core transform has several useful symmetry properties that can be used to reduce implementation cost. For example, the even-odd symmetry in the transform matrix can be utilized to reduce implementation complexity. In another example, the 16×16, 8×8, and 4×4 transform matrices are subsets of the 32×32 transform matrix such that the smaller sized transforms are embedded within the next larger size transform and do not need separate implementation. FIGS. 1A to 1C illustrate this symmetry for 4×4, 8×8, and 16×16 matrices. The embedded values are shown in bold. In another example, there is symmetry between the forward transform and its inverse. These three symmetry properties are used to create an architecture that supports computation of both forward and inverse transforms in a unified fashion, i.e., much of the same hardware may be shared.

Let $M=[M0, M1, M2, M3]^T$ be the input vector and $P=[P0, P1, P2, P3]^T$ denote the output vector of the forward 4-pt transform. The forward 4-pt transform is defined by following equation:

$$P=D_4 M \quad (1)$$

where $D_4$ is given by $$D_4 = \begin{bmatrix} C16 & C16 & C16 & C16 \\ C8 & C24 & -C24 & -C8 \\ C16 & -C16 & -C16 & C16 \\ C24 & -C8 & C8 & -C24 \end{bmatrix} \quad (2)$$

Even-odd decomposition, also referred to as partial butterfly decomposition, may be used to perform the transform computation. For an N-pt forward transform of an N-pt input, even-odd decomposition involves the following three steps: 1) add/subtract the elements of the N-pt input vector to generate an N-pt intermediate vector; 2) calculate the even part of the output using an N/2×N/2 subset of the transform matrix obtained from the even rows of the transform matrix; and 3) calculate the odd part of the output using an N/2×N/2 subset of the transform matrix obtained from the odd rows of the transform matrix.

FIG. 2 illustrates the even-odd decomposition of the forward 4-pt transform. Computation of the direct 4-pt transform using Eq. 1 would require sixteen multiplications. In contrast, the even-odd decomposition computation requires only eight multiplications. FIG. 4A shows the architecture of a forward 4-pt transform implementation using even-odd decomposition.

Figure 4B:
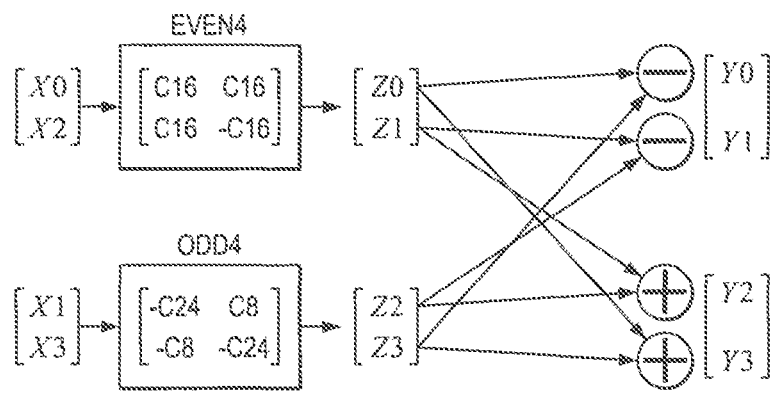

The inverse 4-pt transform is defined by following equation:

$$Y=D_4^T X \quad (3)$$

where $X=[X0, X1, X2, X3]^T$ is the input vector and $Y=[Y0, Y1, Y2, Y3]^T$ is the output of the 4-pt inverse transform. FIG. 3 illustrates the even-odd decomposition of the inverse 4-pt transform. FIG. 4B shows an example architecture of an inverse 4-pt transform implementation using even-odd decomposition. Assuming 16-bit inputs, the inverse transform uses 16-bit×8-bit multipliers whereas the forward transform uses 17-bit×8-bit multipliers since the inputs are added before multiplication in the forward transform.

Figure 5:
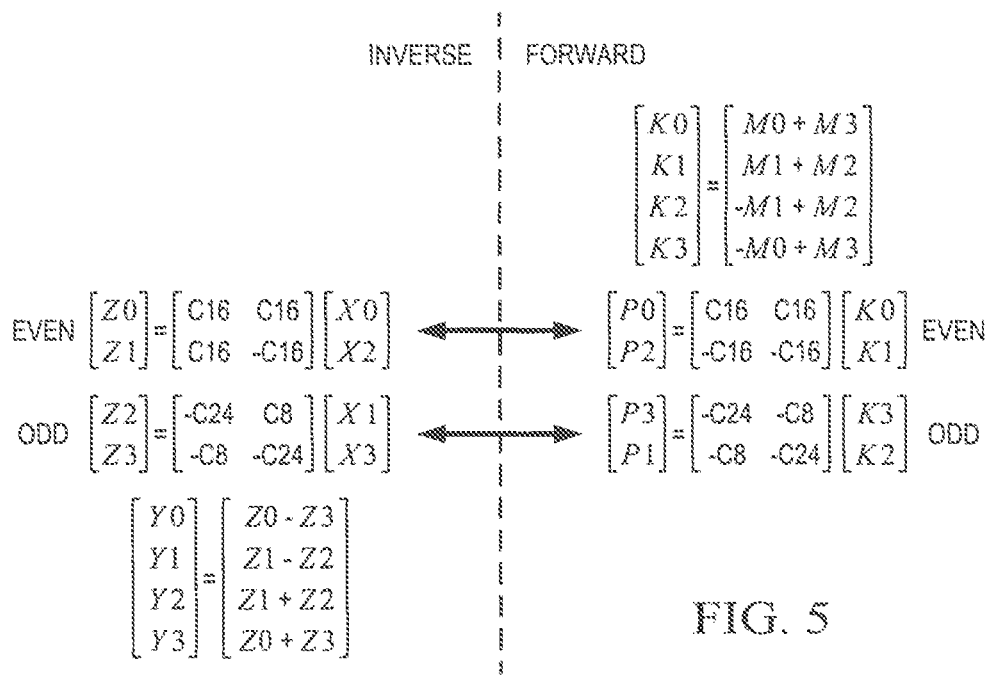
FIG. 5 illustrates the commonality between the even and odd matrices of the forward and inverse 4-pt transform even-odd decompositions.

For a unified forward and inverse transform implementation, additional symmetry between the forward and inverse transform matrices can be exploited to further reduce area. As is illustrated in FIG. 5, the even matrices of the forward and inverse transforms are identical and the odd matrices of the forward and inverse transforms are also identical if the inputs and outputs of the forward odd matrix are reversed. Because of this commonality, a hardware architecture that implements both the forward and inverse 4-pt transforms can share the hardware block that implements the even and odd matrix multiplications.

Figure 6:
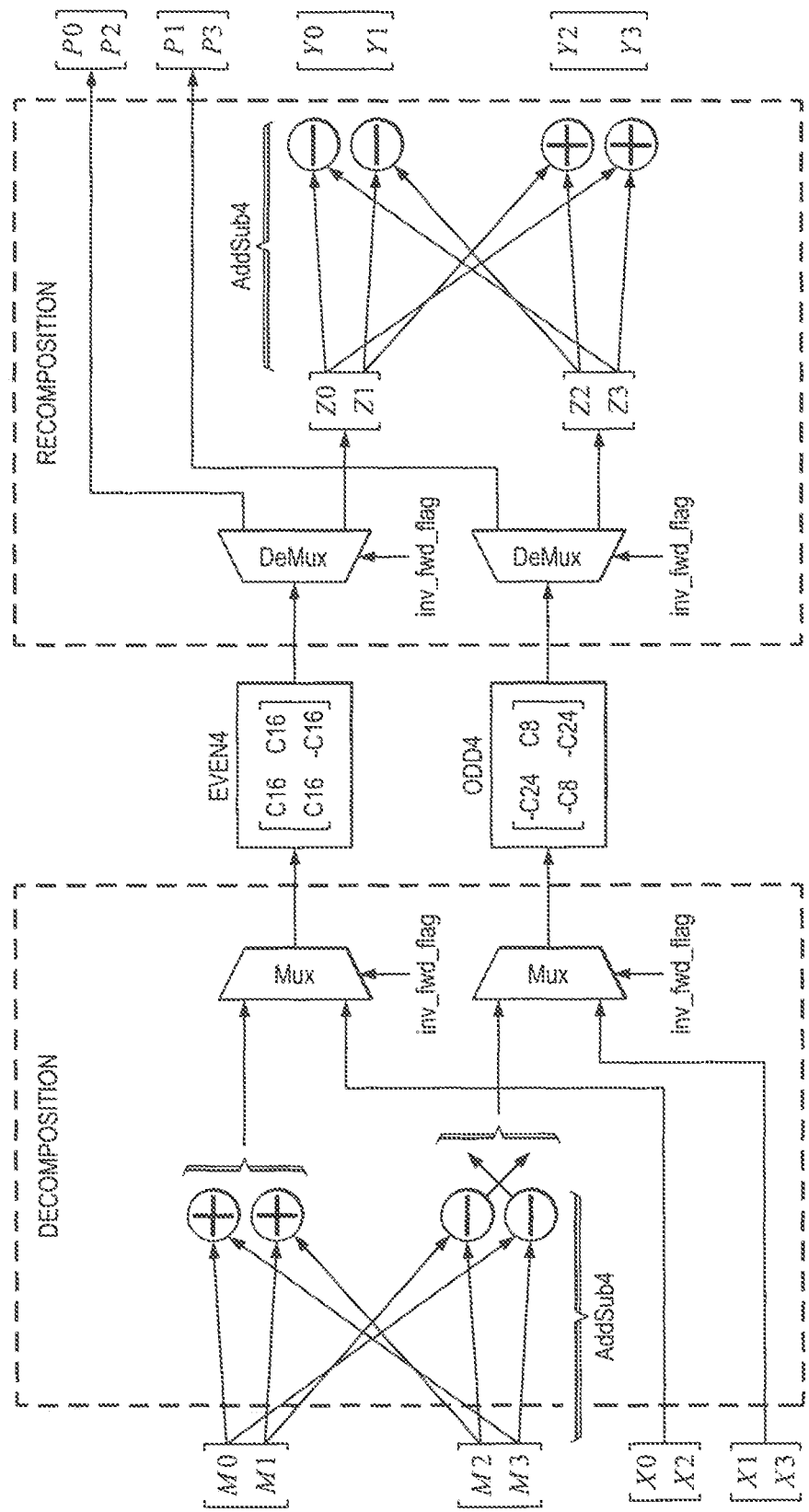
FIG. 6 shows a unified architecture for computation of both forward and inverse 4-pt transforms with a set of inputs for the forward transform and a set of inputs for the inverse transform.

FIG. 6 shows a block diagram of an example architecture implementing a unified forward and inverse 4-pt transform with shared even and odd matrix multiplication circuits. The shared matrix multiplication circuits are labeled, respectively, as Even4 and Odd4. In some embodiments, this unified architecture uses 17-bit×8-bit multipliers. The number of multipliers used for the matrix multiplication circuits is implementation dependent. In some embodiments, each of the matrix multiplication circuits includes four multipliers. For example, eight 17-bit by 8-bit multipliers may be used to achieve a throughput of one 1D 4-pt transform per cycle.

The addition/subtraction logic (AddSub4) on the left implements the additions and subtractions of the 4-pt input vector M to generate the intermediate 4-pt vector K for the forward transform. The addition/subtraction logic on right implements the additions and subtractions of the 4-pt output vector Z to generate the output 4-pt vector Y for the inverse transform. A control signal (inv_fwd_flag) may be set to indicate whether the circuit behaves as a forward or an inverse transform. The multiplexors (Mux) and demultiplexors (Demux) switch up when a forward transform is indicated by the control signal and switch down when an inverse transform is indicated. When switched up, the multiplexors on the left select the outputs of the addition/subtraction network on the left and the demultiplexors on the right select the outputs of the matrix multiplication circuits as the outputs of the forward transform. When switched down, the mulitplexors on the left select the inverse transform inputs and the demultiplexors on the right send the outputs of the matrix multiplication circuits to the addition/subtraction network on the right for generation of the outputs of the inverse transform. The addition/subtraction logic on the left and the multiplexors may be referred to as a decomposition circuit. The addition/subtraction logic on the right and the demultiplexors may be referred to as a recomposition circuit.

Although not explicitly shown, the final outputs of the forward and inverse transform computations are rounded before being stored. The rounding circuit is also shared by the forward and inverse transforms.

Figure 7:
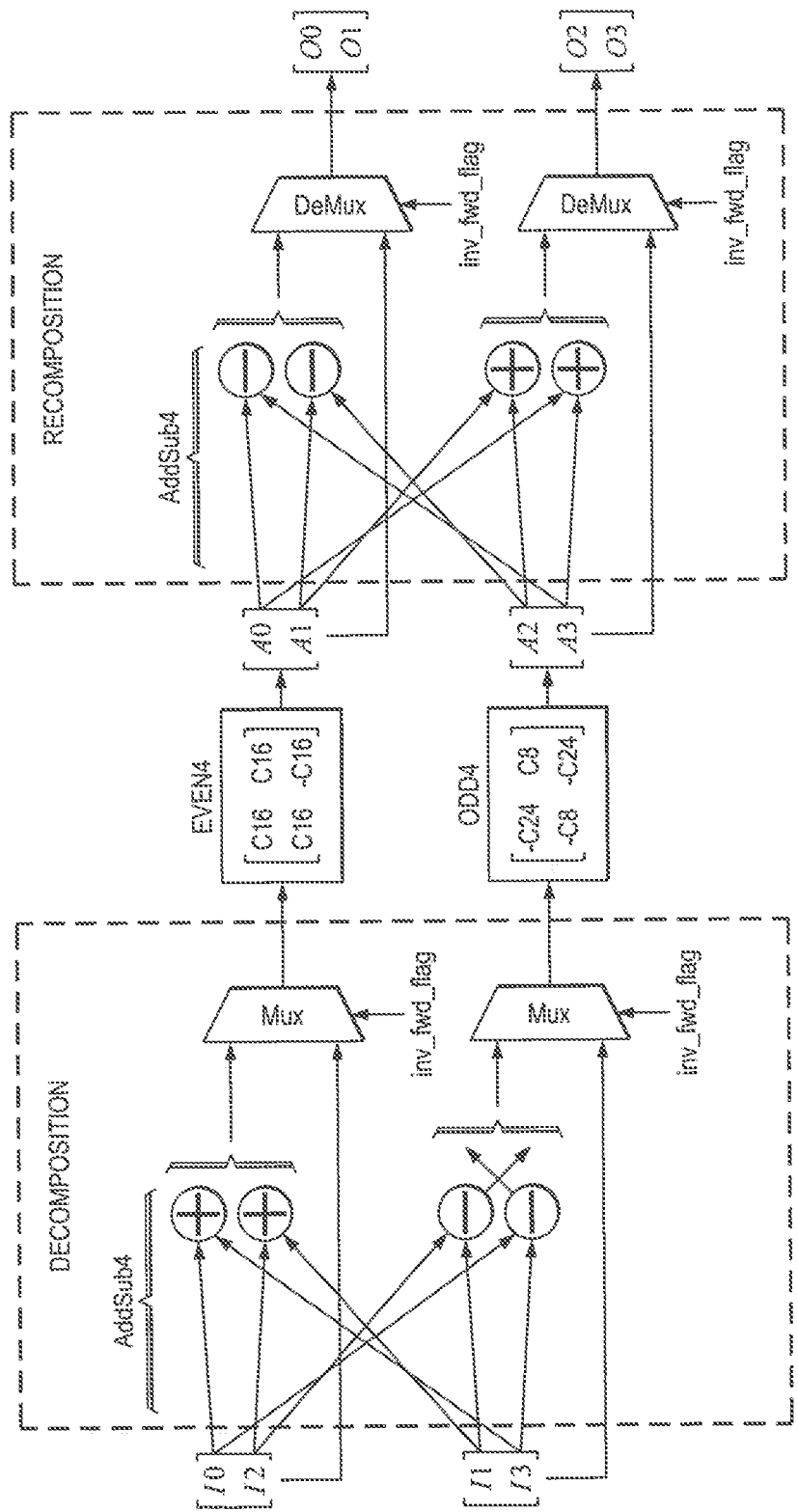
FIG. 7 shows a unified architecture for computation of both forward and inverse 4-pt transforms with a single set of inputs.

FIG. 7 shows a block diagram of an example architecture implementing a unified forward and inverse 4-pt transform with even and odd matrix multiplication sharing and with a single set of inputs I=[I0, I1, I2, I3]. The inputs I=M for a forward transform computation and the inputs I=X for an inverse transform computation. The outputs for the forward transform computation are [O0,O1]=[P0,P2] and [O2,O3]=[P0,P3]. The outputs for the inverse transform computation are [O0,O1]=[Y0,Y1] and [O2,O3]=[Y2,Y3]. The intermediate outputs from the matrix multiplication circuits for the forward transform computation are [A0,A1]=[P0,P2] and [A2,A3]=[P0,P3]. The intermediate outputs from the matrix multiplication circuits for the inverse transform computation are [A0,A1]=[Z0,Z1] and [A2, A3]=[Z2, Z3].

The addition/subtraction logic (AddSub4) on the left implements the additions and subtractions of the 4-pt input vector I to generate the intermediate 4-pt multiplicand vector for the forward transform. The addition/subtraction logic on right implements the additions and subtractions of the 4-pt output vector A to generate the output 4-pt vector O for the inverse transform. A control signal (inv_fwd_flag) may be set to indicate whether the circuit behaves as a forward or an inverse transform. The multiplexors (Mux) and demultiplexors (Demux) switch up when a forward transform is indicated by the control signal and switch down when an inverse transform is indicated. When switched up, the multiplexors on the left select the outputs of the addition/subtraction logic on the left and the demultiplexors on the right select the outputs of the multiplication circuits. When switched down, the multiplexors on the left select the inputs and the demultiplexors on the right select the outputs of the addition/subtraction logic on the right. The addition/subtraction logic on the left and the multiplexors may be referred to as a decomposition circuit. The addition/subtraction logic on the right and the demultiplexors may be referred to as a recomposition circuit.

Let $M=[M0, \ldots, M7]^T$ be the input vector and $P=[P0, \ldots, P7]^T$ denote the output of the forward 8-pt transform. The forward 8-pt transform is defined by following equation:

$$P = D_8 M \qquad (4)$$

where $D_8$ is given by $$D_8 = \begin{bmatrix} C16 & C16 & C16 & C16 & C16 & C16 & C16 & C16 \\ C4 & C12 & C20 & C28 & -C28 & -C20 & -C12 & -C4 \\ C8 & C24 & -C24 & -C8 & -C8 & -C24 & C24 & C8 \\ C12 & -C28 & -C4 & -C20 & C20 & C4 & C28 & -C12 \\ C16 & -C16 & -C16 & C16 & C16 & -C16 & -C16 & C16 \\ C20 & -C4 & C28 & C12 & -C12 & -C28 & C4 & -C20 \\ C24 & -C8 & C8 & -C24 & -C24 & C8 & -C8 & C24 \\ C28 & -C20 & C12 & -C4 & C4 & -C12 & C20 & -C28 \end{bmatrix} \qquad (5)$$

Figure 8:
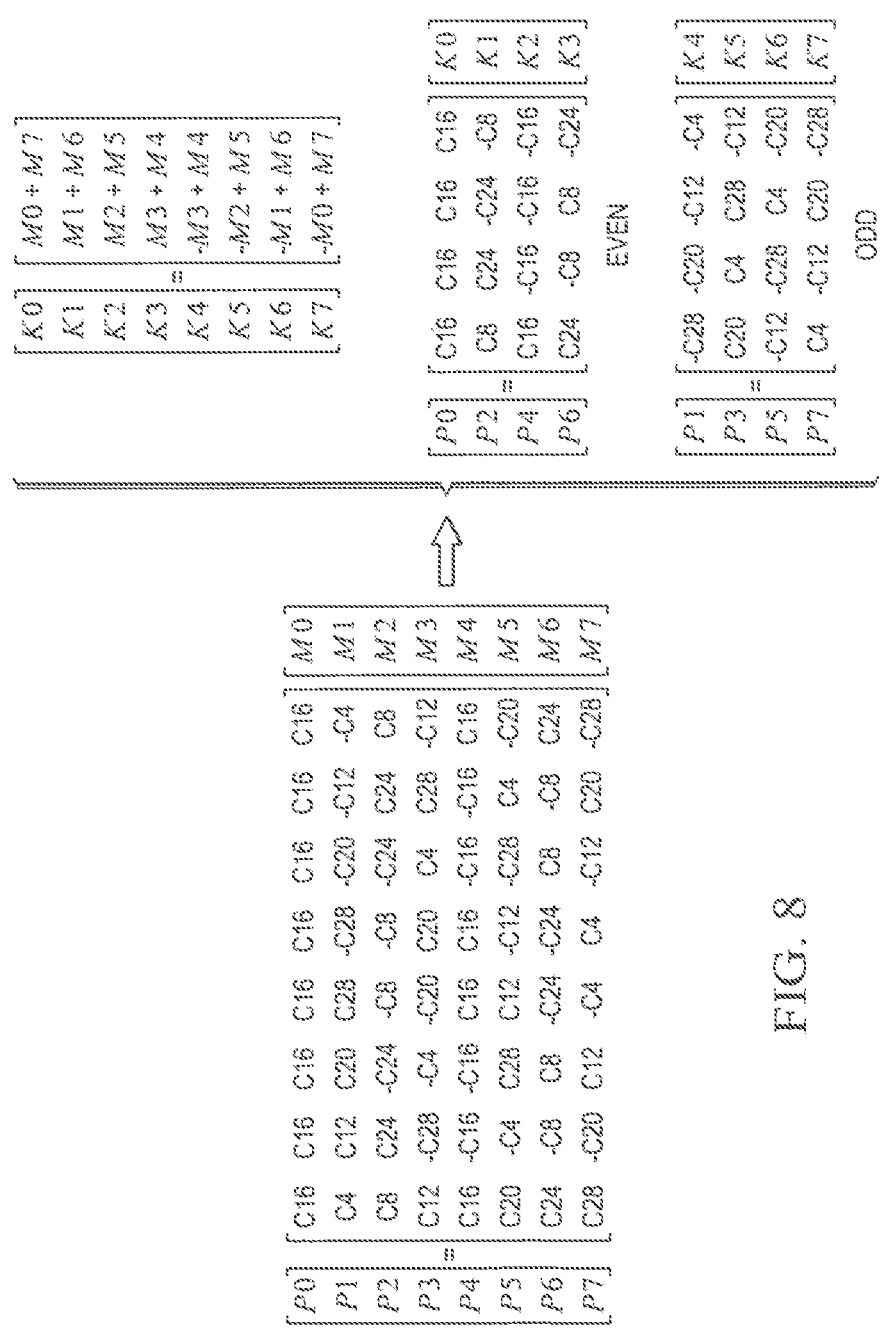
Figure 9:
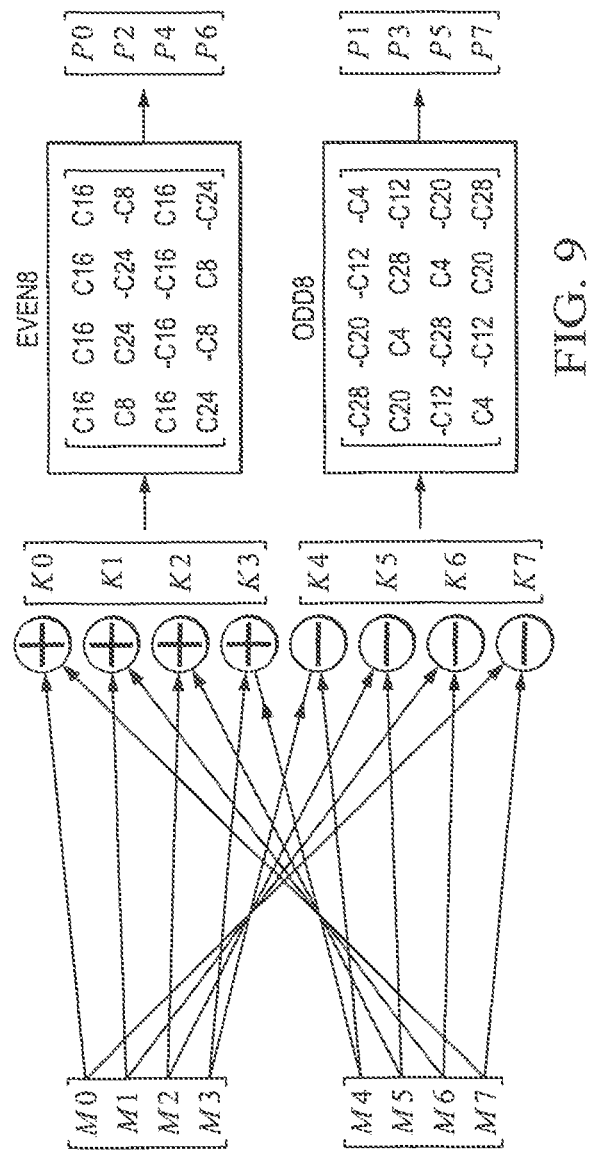
FIG. 9 shows an architecture for a forward 8-pt transform implementation using even-odd decomposition.

FIG. 8 illustrates the even-odd decomposition of the forward 8-pt transform. Computation of the direct 8-pt transform using Eq. 4 would require 64 multiplications. In contrast, the even-odd decomposition computation may require a maximum of 32 multiplications. The number of multiplications can be reduced if the even matrix is further decomposed. FIG. 9 shows an example architecture of a forward 8-pt transform implementation using even-odd decomposition.

Figure 11:
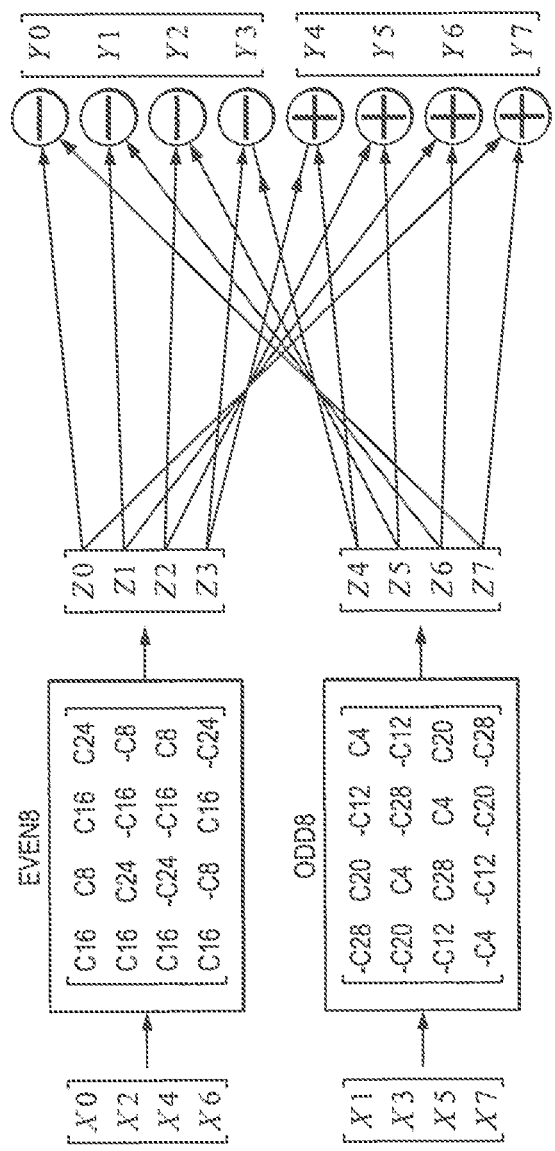
FIG. 11 shows an architecture for an inverse 8-pt transform implementation using even-odd decomposition.

The inverse 8-pt transform is defined by following equation:

$$Y = D_8^T X \qquad (3)$$

where $X=[X0, \ldots, X7]^T$ is the input vector and $Y=[Y0, \ldots, Y7]^T$ is the output of the 8-pt inverse transform. FIG. 10 illustrates the even-odd decomposition of the inverse 8-pt transform. FIG. 11 shows an example architecture of an inverse 8-pt transform implementation using even-odd decomposition. As with the 4-pt architectures, assuming 16-bit inputs, the inverse transform may use 16-bit×8-bit multipliers whereas the forward transform may use 17-bit×8-bit multipliers since the inputs are added before multiplication in the forward transform.

Figure 12:
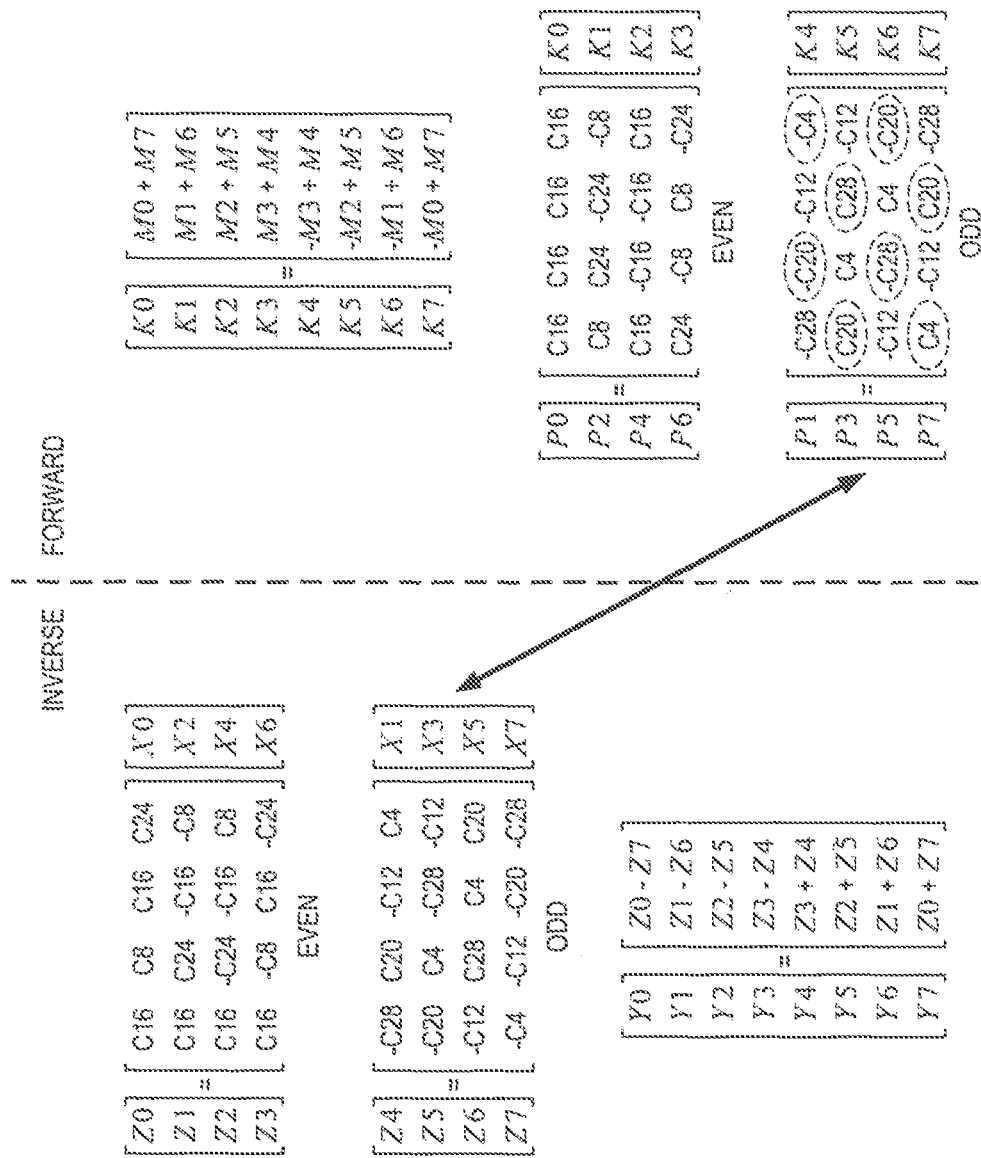
FIG. 12 illustrates the commonality between the even and odd matrices of the forward and inverse 8-pt transform even-odd decompositions.

The even matrix of the 8-pt forward transform of FIG. 8 is identical to the 4-pt forward transform of Eq. 2 and the even matrix of the 8-pt inverse transform of FIG. 10 is identical to the 4-pt inverse transform of Eq. 4. Thus, the unified 4-pt transform architecture of FIG. 6 can be used to implement the even parts of the 8-pt forward and inverse transforms. Further, as illustrated in FIG. 12, the odd matrix of the forward 8-pt transform and the odd matrix of the inverse 8-pt transform have identical multiplicands which differ in sign for half of the elements. The elements with the differing signs are circled in the odd matrix of the forward transform.

Figure 13:
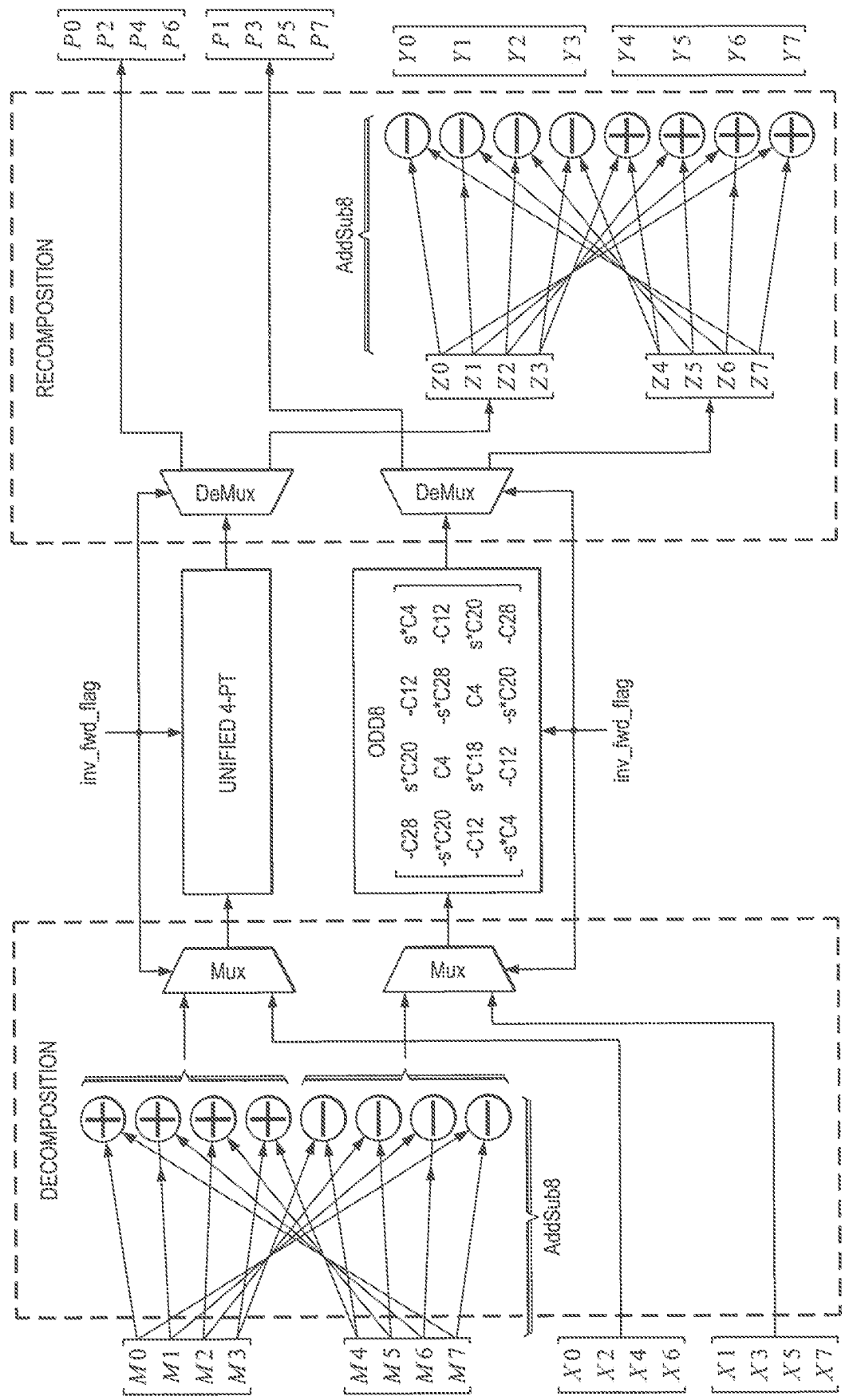
FIG. 13 shows a unified architecture for computation of both forward and inverse 8-pt transforms with a set of inputs for the forward transform and a set of inputs for the inverse transform.

FIG. 13 shows a block diagram of an example architecture implementing a unified forward and inverse 8-pt transform. The architecture is similar to that of FIG. 6 for the 4-pt transform. The even and odd matrix multiplication circuits are shared for the computation of the forward and inverse transforms. A control signal (inv_fwd_flag) may be set to indicate whether the circuit behaves as a forward or an inverse transform. The even matrix multiplication circuit (Unified 4-Pt) is implemented as the unified 4-pt architecture of FIG. 6, i.e., is a forward and inverse 4-pt transform computation circuit. The odd matrix multiplication circuit (Odd8) implements matrix multiplication with the 8-pt odd matrix. The odd matrix contains the shared transform coefficients of the forward and inverse 8-pt odd matrices. Note that the architecture of FIG. 13 shows hardware sharing for the forward and inverse 8-pt transforms as well as hardware sharing between the forward and inverse 4-pt transforms and the forward and inverse 8-pt transforms.

The constant s appears beside each coefficient in which the sign differs between the forward and inverse 8-pt odd matrices. The value of s may be changed responsive to the control signal to change the signs of these coefficients. When the control signal indicates the computation of a forward transform, the value of s is −1 and when the control signal indicates the computation of an inverse transform, the value of s is 1. Alternatively, the coefficients with "s" can be multiplied first and summed and the sign can be changed for the final sum of product terms. For example, the multiplication of the first column [−c28 s*c20−c12 s*c4] with a four point vector, e.g., X0, X1, X2, X3, can be carried as −c28*X0−c12*X2+s(c20*X1+c4*X3). The multiplication and accumulation of X1 and X3 with c20 and c4 can be carried out first and then the sign can be changed instead of changing the sign of c20 and c4 first before multiplication.

The addition/subtraction logic (AddSub8) on the left implements the additions and subtractions of the 8-pt input vector M to generate the intermediate 8-pt multiplicand vector for the forward transform. The addition/subtraction logic on right implements the additions and subtractions of the 8-pt output vector Z to generate the output 8-pt vector Y for the inverse transform. The multiplexors (Mux) and demultiplexors (Demux) switch up when a forward transform is indicated by the control signal and switch down when an inverse transform is indicated. When switched up, the multiplexors on the left select the outputs of the addition/subtraction logic on the left and the demultiplexors on the right select the outputs of the matrix multiplication circuits as the outputs of the forward transform. When switched down, the mulitplexors on the left select the inverse transform inputs and the demultiplexors on the right send the outputs of the matrix multiplication circuits to the addition/subtraction logic on the right for generation of the outputs of the inverse transform. The addition/subtraction logic on the left and the multiplexors may be referred to as a decomposition circuit. The addition/subtraction logic on the right and the demultiplexors may be referred to as a recomposition circuit.

Although not explicitly shown, the final outputs of the forward and inverse transform computations are rounded before being stored. The rounding circuit is also shared by the forward and inverse transforms.

The architecture of FIG. 13 includes separate inputs for the forward and inverse transforms. This architecture may be modified to have shared inputs for the forward and inverse transforms in a similar fashion to the modifications made to convert the separate input architecture of FIG. 6 to the shared input architecture of FIG. 7.

The architecture of FIG. 13 can be extended for larger transforms, e.g., for N=16, 32, etc. The even matrix of the 16-pt forward transform is identical to the 8-pt forward transform and the even matrix of the 16-pt inverse transform is identical to the 8-pt inverse transform. Further, the forward and inverse odd matrices have identical multiplicands, some of which differ in sign. The even matrix of the 32-pt forward transform is identical to the 16-pt forward transform and the even matrix of the 32-pt inverse transform is identical to the 16-pt inverse transform. Further, the forward and inverse odd matrices have identical multiplicands, some of which differ in sign. The sign differences may be handled in a similar fashion to that described for the 8-pt transform architecture.

Figure 14:
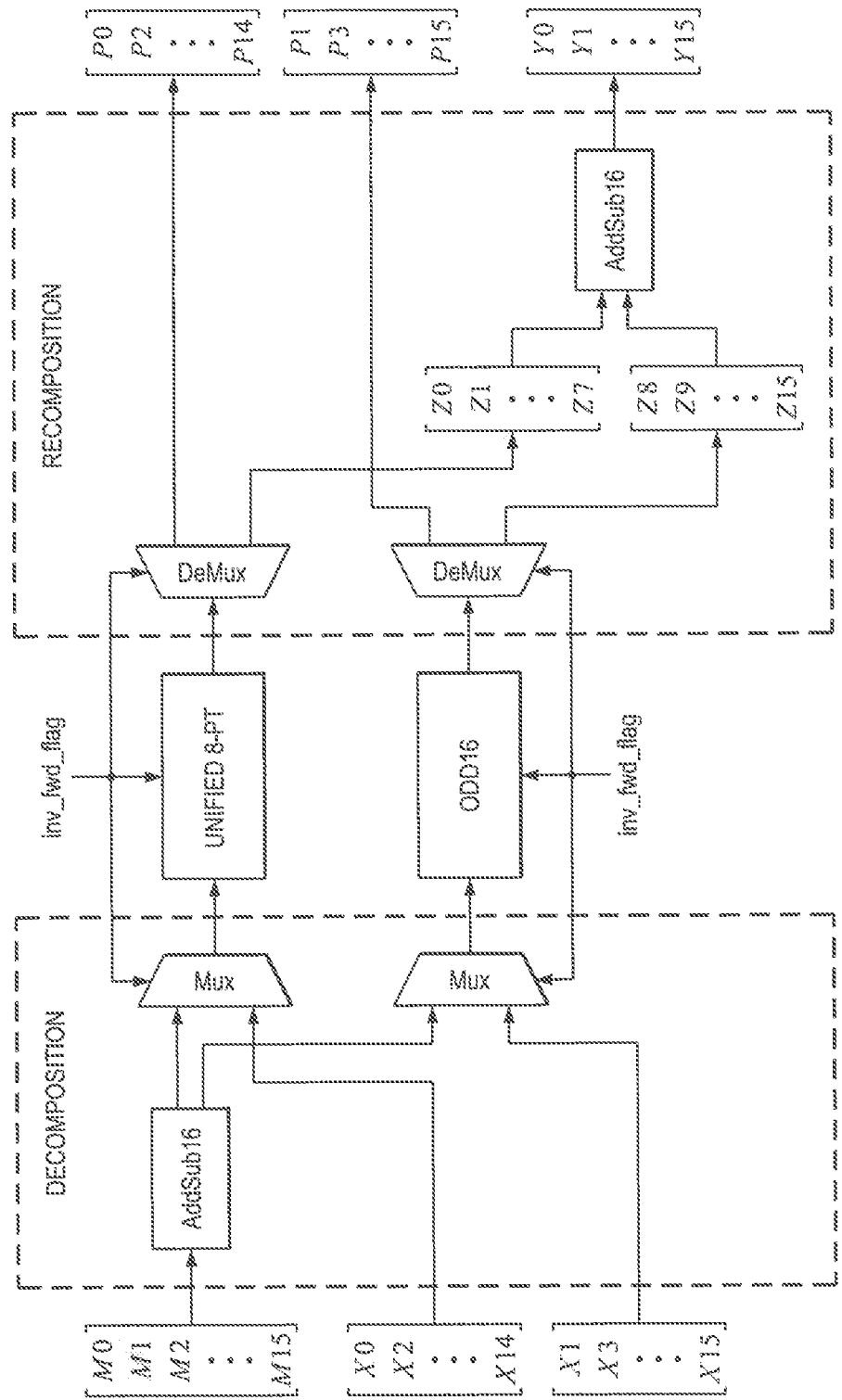
FIG. 14 shows a unified architecture for computation of both forward and inverse 16-pt transforms with a set of inputs for the forward transform and a set of inputs for the inverse transform.

FIG. 14 shows a block diagram of an example architecture implementing a unified forward and inverse 16-pt transform. The even matrix multiplication circuit (Unified 8-Pt) is implemented as the unified 8-pt architecture of FIG. 13, i.e., is a forward and inverse 8-pt transform computation circuit. Note that the architecture of FIG. 14 shows hardware sharing for the forward and inverse 16-pt transforms, hardware sharing between the forward and inverse 8-pt transforms and the forward and inverse 16-pt transforms, hardware sharing for the forward and inverse 8-pt transforms, and hardware sharing between the forward and inverse 4-pt transforms and the forward and inverse 8-pt transforms. The addition/subtraction logic on the left and the multiplexors may be referred to as a decomposition circuit. The addition/subtraction logic on the right and the demultiplexors may be referred to as a recomposition circuit.

Figure 15:
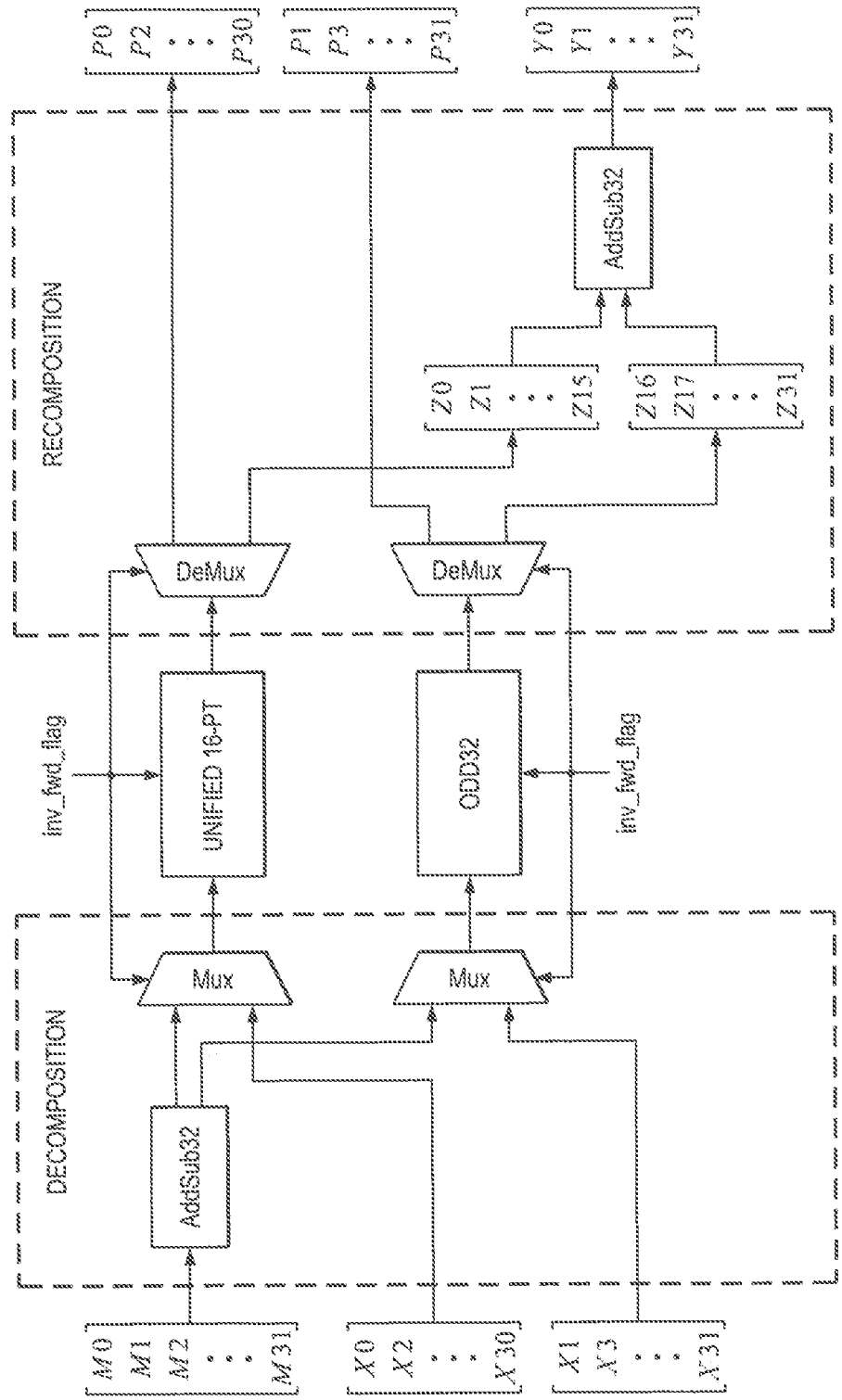
FIG. 15 shows a unified architecture for computation of both forward and inverse 32-pt transforms with a set of inputs for the forward transform and a set of inputs for the inverse transform.

FIG. 15 shows a block diagram of an example architecture implementing a unified forward and inverse 32-pt transform. The even matrix multiplication circuit (Unified 16-Pt) is implemented as the unified 16-pt architecture of FIG. 14, i.e., is a forward and inverse 16-pt transform computation circuit. Note that the architecture of FIG. 15 shows hardware sharing for the forward and inverse 32-pt transforms, hardware sharing between the forward and inverse 16-pt transforms and the forward and inverse 32-pt transforms, hardware sharing for the forward and inverse 16-pt transforms, hardware sharing between the forward and inverse 8-pt transforms and the forward and inverse 16-pt transforms, hardware sharing for the forward and inverse 8-pt transforms, and hardware sharing between the forward and inverse 4-pt transforms and the forward and inverse 8-pt transforms. The addition/subtraction logic on the left and the multiplexors may be referred to as a decomposition circuit. The addition/subtraction logic on the right and the demultiplexors may be referred to as a recomposition circuit.

The architectures of FIGS. 14 and 15 include separate inputs for the forward and inverse transforms. These architectures may be modified to have shared inputs for the forward and inverse transforms in a similar fashion to the modifications made to convert the separate input architecture of FIG. 6 to the shared input architecture of FIG. 7. Further, although not explicitly shown, the final outputs of the forward and inverse transform computations are rounded before being stored. The rounding circuit is also shared by the forward and inverse transforms.

Figure 16:
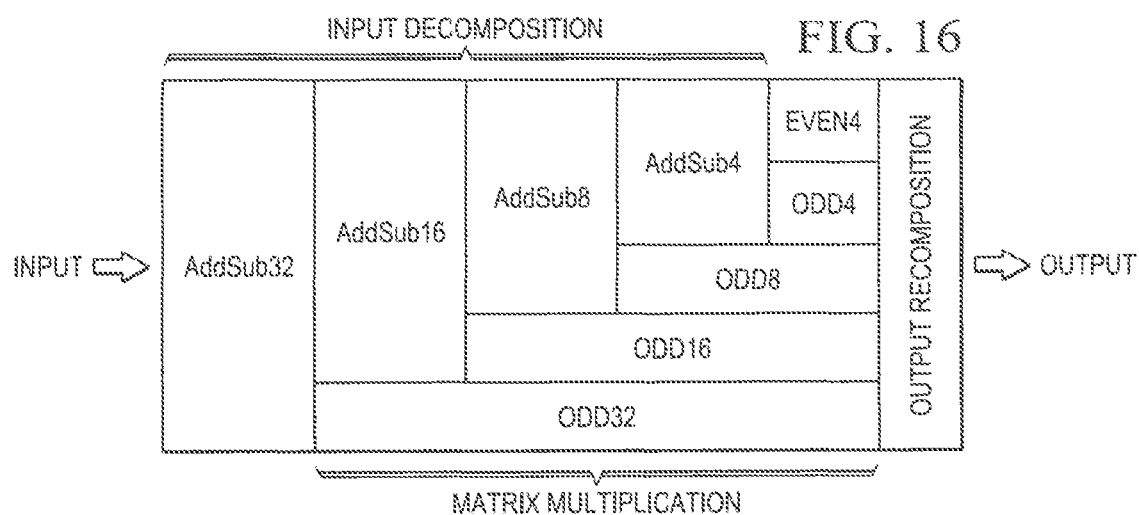
FIG. 16 illustrates the flow of forward transform computation in a unified 32-pt forward and inverse transform architecture.

FIG. 16 illustrates the flow of a forward N-point transform computation in the unified forward and inverse transform architecture of FIG. 15. The flow is explained for a 32-pt forward transform computation. Let $M=[M0, M1, \ldots, M31]^T$ denote the input vector and $P=[P0, P1, \ldots, P31]^T$ denote the output vector of the forward 32-pt transform. For a 32-pt forward transform computation, the elements of the 32-pt input vector M32 are the inputs for the addition and subtraction logic (AddSub32) of the 32-pt forward transform architecture. The output of the AddSub32 logic, the 32-pt intermediate multiplicand vector $D=[D0, D1, \ldots, D31]$, is decomposed such that the first sixteen elements [D0, D1, ..., D15] are the inputs for the addition and subtraction logic (AddSub16) of the 16-pt forward transform architecture and the last sixteen elements [D16, D17, ..., D31] are the inputs for the Odd32 multiplication circuit. The outputs of the Odd32 multiplication circuit are the sixteen odd elements of the 32-pt output vector P, i.e., $$\begin{bmatrix} P1 \\ P3 \\ P5 \\ \vdots \\ P31 \end{bmatrix} = [\text{Odd } 32] \begin{bmatrix} D16 \\ D17 \\ D18 \\ \vdots \\ D31 \end{bmatrix}.$$

The output of the AddSub16 logic, the 16-pt intermediate multiplicand vector $E=[E0, E1, \ldots, E15]$, is decomposed such that the first eight elements [E0, E1, ..., E7] are the inputs for the addition and subtraction logic (AddSub8) of the 8-pt forward transform architecture and the last eight elements [E8, E9, ..., E15] are the inputs for the Odd16 multiplication circuit. The outputs of the Odd16 multiplication circuit are every fourth even element of the 32-pt output vector P starting, with P2, i.e., $$\begin{bmatrix} P2 \\ P6 \\ P10 \\ \vdots \\ P30 \end{bmatrix} = [\text{Odd } 16] \begin{bmatrix} E8 \\ E9 \\ E10 \\ \vdots \\ E15 \end{bmatrix}.$$

The output of the AddSub8 logic, the 8-pt intermediate multiplicand vector $F=[F0, F1, \ldots, F7]$, is decomposed such that the first four elements [F0, F1, F2, F3] are the inputs for the addition and subtraction logic (AddSub4) of the 4-pt forward transform architecture and the last four elements [F4, F5, F6, F7] are the inputs for the Odd8 multiplication circuit. The outputs of the Odd8 multiplication circuit are every eighth even element of the 32-pt output vector P starting with P4, i.e., $$\begin{bmatrix} P4 \\ P12 \\ P20 \\ P28 \end{bmatrix} = [\text{Odd } 8] \begin{bmatrix} F4 \\ F5 \\ F6 \\ F7 \end{bmatrix}.$$

The output of the AddSub4 logic, the 4-pt intermediate multiplicand vector G=[G0, G1, G2, G3], is decomposed such that the first two elements [G0,G1] are the inputs for the Even4 multiplication circuit of the 4-pt forward transform architecture and the last two elements [G2,G3] are the inputs for the Odd4 multiplication circuit. The outputs of the Odd4 multiplication circuit are the first and seventeenth elements, P0 and P16, of the 32-pt output vector P and the outputs of the Even4 multiplication circuit are the ninth and twenty-fifth elements, P8 and P24, of the 32-pt output vector P, i.e., $$\begin{bmatrix} P0 \\ P16 \end{bmatrix} = [\text{Even } 4] \begin{bmatrix} G0 \\ G1 \end{bmatrix}$$

$$\begin{bmatrix} P8 \\ P24 \end{bmatrix} = [\text{Odd } 4] \begin{bmatrix} G2 \\ G3 \end{bmatrix}.$$

Smaller forward transforms may be computed using the architecture of FIG. 15. For example, to compute a 16-pt forward transform with an input vector of [M0, M1, . . . , M15], the actual input vector may be a 32-pt vector [M0, M1, . . . , M15, 0, 0, . . . , 0] and the output results at P2, P4, P6, P8, . . . , P30 may be read. Two possible ways to input [M0, M1, . . . , M15, 0, 0, . . . , 0] are to input the actual values or to have a control flag that may be set to bypass the inputs for M16, M17, . . . , M31 and set them to 0. Two possible ways to get the output are to read the final 32-point output and pick P2, P4, P6, P8, etc. or to tap out the output of Even4, Odd4, Odd8, Odd16 without activating the output of Odd32. An 8-pt forward transform or a 4-pt forward transform may be similarly computed.

Figure 17:
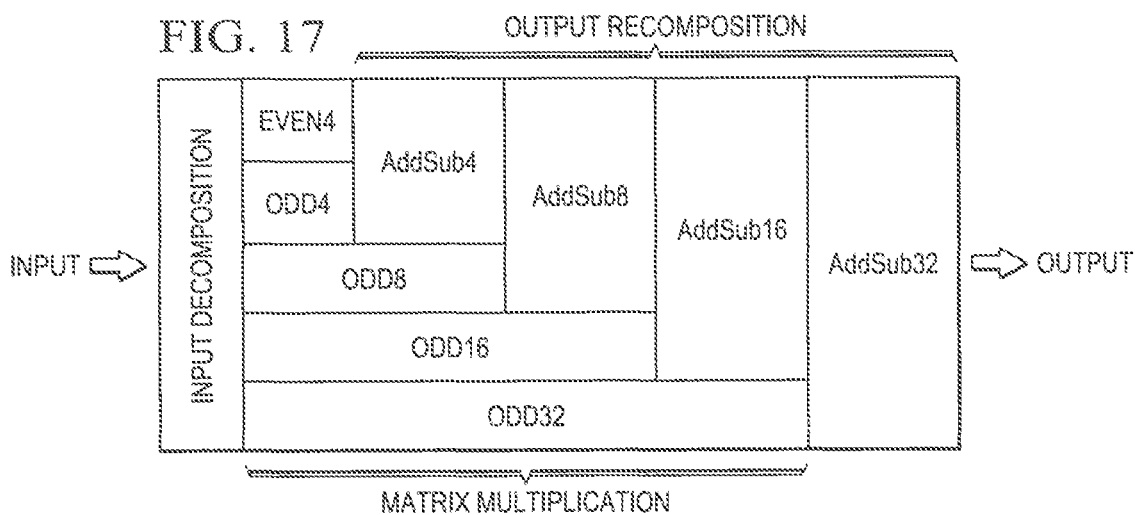
FIG. 17 illustrates the flow of inverse transform computation in a unified 32-pt forward and inverse transform architecture.

FIG. 17 illustrates the flow of an inverse N-point transform computation in the unified forward and inverse transform architecture of FIG. 15. The flow is explained for a 32-pt inverse transform computation. Let X=[0, X1, . . . , X31]$^T$ denote the input vector, Z=[Z0, Z1, . . . , Z31] denote the intermediate output vector, and Y=[Y0, Y1, . . . , Y31]$^T$ denote the output vector of the inverse 32-pt transform. For a 32-pt inverse transform computation, the 32-pt input vector X is decomposed into five vectors for inputs to the Even4, Odd4, Odd8, Odd16, and Odd32 matrix multiplication circuits. The inputs for these matrix multiplication circuits are, respectively, [X0, X16], [X8, X24], [X4, X12, X20, X28], [X2, X6, X10, . . . , X30], and [X1, X3, X5, . . . , X31].

The outputs of the Even4 multiplication circuit are $$\begin{bmatrix} U0 \\ U1 \end{bmatrix} = [\text{Even } 4] \begin{bmatrix} X0 \\ X16 \end{bmatrix}$$

the outputs of the Odd4 multiplication circuit are $$\begin{bmatrix} U2 \\ U3 \end{bmatrix} = [\text{Odd } 8] \begin{bmatrix} X8 \\ X24 \end{bmatrix}.$$

These outputs form the input vector U for the AddSub4 logic. The outputs of the AddSub4 logic are the first four elements [V0, V1, V2, V3] of the intermediate output vector V of the 8-pt inverse transform computation. The outputs of the Odd8 multiplication circuit are the last four elements of the intermediate output vector V, i.e., $$\begin{bmatrix} V4 \\ V5 \\ V6 \\ V7 \end{bmatrix} = [\text{Odd } 8] \begin{bmatrix} X4 \\ X12 \\ X20 \\ X28 \end{bmatrix}.$$

The elements of the intermediate output vector V are the inputs to the AddSub8 logic. The outputs of the AddSub8 logic are the first eight elements [W0, W1, . . . , W7] of the intermediate output vector W of the 16-pt inverse transform computation. The outputs of the Odd16 multiplication circuit are the last eight elements of the intermediate output vector W, i.e., $$\begin{bmatrix} W8 \\ W9 \\ W10 \\ \vdots \\ W15 \end{bmatrix} = [\text{Odd } 16] \begin{bmatrix} X2 \\ X6 \\ X10 \\ \vdots \\ X30 \end{bmatrix}.$$

The elements of the intermediate output vector W are the inputs to the AddSub16 logic. The outputs of the AddSub16 logic are the first sixteen elements [Z0, Z1, . . . , Z15] of the intermediate output vector Z of the 32-pt inverse transform computation. The outputs of the Odd32 multiplication circuit are the last sixteen elements of the intermediate output vector Z, i.e., $$\begin{bmatrix} Z16 \\ Z17 \\ Z18 \\ \vdots \\ Z31 \end{bmatrix} = [\text{Odd } 32] \begin{bmatrix} X1 \\ X3 \\ X5 \\ \vdots \\ X31 \end{bmatrix}.$$

The elements of the output vector z are the inputs to the AddSub32 logic. The outputs of the AddSub32 logic form the 32-pt output vector Y.

Smaller inverse transforms may be computed using the architecture of FIG. 15. For example, to compute a 16-pt inverse transform with an input vector of [X0, X1, . . . , X15], the actual input vector may be a 32-pt vector [X0, X1, . . . , X15, 0, 0, . . . , 0] and the outputs for Y0, Y1, . . . , Y15 may be read and the rest, which will all be 0, ignored. Two possible ways to input [X0, X1, . . . , X15, 0, 0, . . . , 0] are to input the actual values or to have a control flag that may be set to bypass the inputs for X16, X17, . . . , X31 and set them to 0. An 8-pt inverse transform or a 4-pt inverse transform may be similarly computed.

For the inverse N-pt transform computation of FIG. 17, the addition and subtraction logic comes after the multiplication circuits. Thus, the multiplication circuits Odd32, Odd16, Odd8, and Odd4 can be implemented 16×8 multipliers. For the forward N-pt transform computation of FIG. 16, the addition and subtraction logic comes before the matrix multiplication circuits, so the Odd32 multiplication circuit can be implemented with 17×8 multipliers, the Odd16 multiplication circuit can be implemented with 18×8 multipliers, the Odd8 multiplication circuit can be implemented with 19×8 multipliers, and the Odd4 multiplication circuit can be implemented with 20×8 multipliers.

Figure 18:
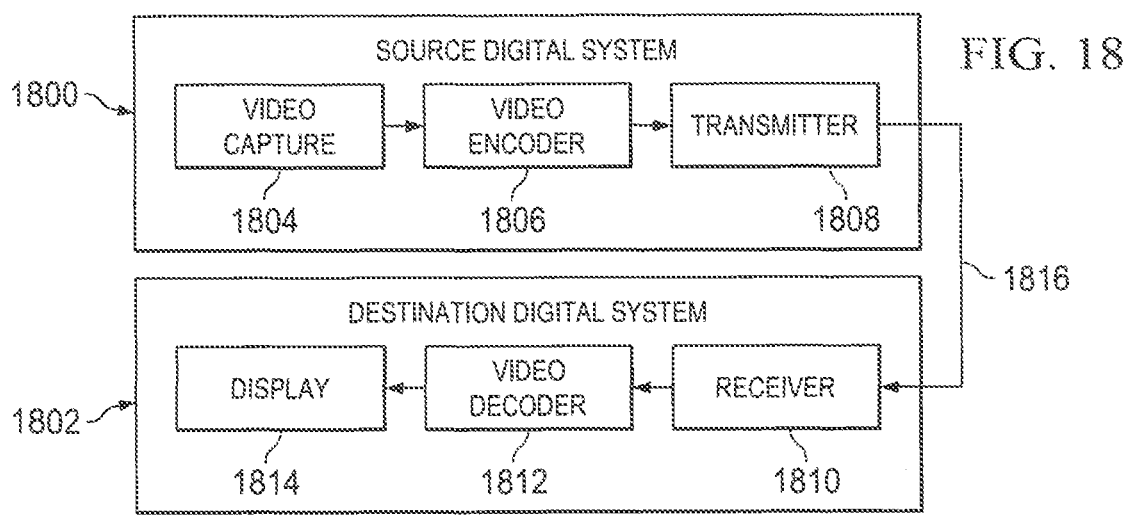
FIG. 18 is a block diagram of a digital system.

FIG. 18 shows a block diagram of a digital system that includes a source digital system 1800 that transmits encoded video sequences to a destination digital system 1802 via a communication channel 1816. The source digital system 1800 includes a video capture component 1804, a video encoder component 1806, and a transmitter component 1808. The video capture component 1804 is configured to provide a video sequence to be encoded by the video encoder component 1806. The video capture component 1804 may be, for example, a video camera, a video archive, or a video feed from a video content provider. In some embodiments, the video capture component 1804 may generate computer graphics as the video sequence, or a combination of live video, archived video, and/or computer-generated video.

The video encoder component 1806 receives a video sequence from the video capture component 1804 and encodes it for transmission by the transmitter component 1808. The video encoder component 1806 receives the video sequence from the video capture component 1804 as a sequence of pictures, divides the pictures into largest coding units (LCUs), and encodes the video data in the LCUs. As part of the encoding process, the video encoder component 1806 may compute forward and inverse transforms using a unified forward and inverse transform architecture as described herein. An embodiment of the video encoder component 1806 is described in more detail herein in reference to FIG. 19.

The transmitter component 1808 transmits the encoded video data to the destination digital system 1802 via the communication channel 1816. The communication channel 1816 may be any communication medium, or combination of communication media suitable for transmission of the encoded video sequence, such as, for example, wired or wireless communication media, a local area network, or a wide area network.

The destination digital system 1802 includes a receiver component 1810, a video decoder component 1812 and a display component 1814. The receiver component 1810 receives the encoded video data from the source digital system 1800 via the communication channel 1816 and provides the encoded video data to the video decoder component 1812 for decoding. The video decoder component 1812 reverses the encoding process performed by the video encoder component 1806 to reconstruct the LCUs of the video sequence. An embodiment of the video decoder component 1812 is described in more detail below in reference to FIG. 20.

The reconstructed video sequence is displayed on the display component 1814. The display component 1814 may be any suitable display device such as, for example, a plasma display, a liquid crystal display (LCD), a light emitting diode (LED) display, etc.

In some embodiments, the source digital system 1800 may also include a receiver component and a video decoder component and/or the destination digital system 1802 may include a transmitter component and a video encoder component for transmission of video sequences both directions for video steaming, video broadcasting, and video telephony. In such embodiments, the video encoder component and the video decoder component may share the same hardware for computation of forward and inverse transforms. That is, the video encoder component may compute forward and inverse transforms using a unified forward and inverse transform architecture as described herein and the video decoder component may compute inverse transformations using the unified forward and inverse transform architecture. Further, the video encoder component 1806 and the video decoder component 1812 may perform encoding and decoding in accordance with one or more video compression standards. The video encoder component 1806 and the video decoder component 1812 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 19:
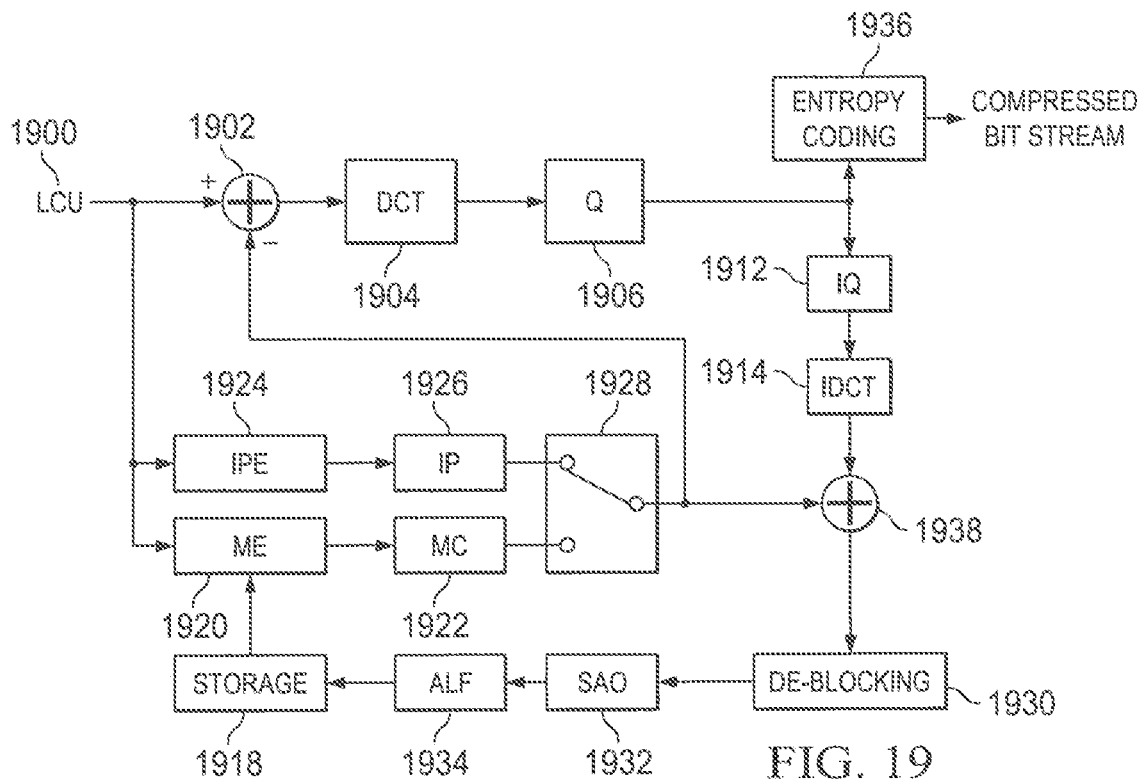
FIG. 19 is a block diagram of a video encoder.

FIG. 19 is a block diagram of the LCU processing portion of an example video encoder. A coding control component (not shown) sequences the various operations of the LCU processing, i.e., the coding control component runs the main control loop for video encoding. The coding control component receives a digital video sequence and performs any processing on the input video sequence that is to be done at the picture level, such as determining the coding type (I, P, or B) of a picture based on the high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The LCU processing receives LCUs 1900 of the input video sequence from the coding control component and encodes the LCUs 1900 under the control of the coding control component to generate the compressed video stream. The LCUs 1900 in each picture are processed in row order. The LCUs 1900 from the coding control component are provided as one input of a motion estimation component (ME) 1920, as one input of an intra-prediction estimation component (IPE) 1924, and to a positive input of a combiner 1902 (e.g., adder or subtractor or the like). Further, although not specifically shown, the prediction mode of each picture as selected by the coding control component is provided to a mode decision component 1928 and the entropy coding component 1936.

The storage component 1918 provides reference data to the motion estimation component 1920 and to the motion compensation component 1922. The reference data may include one or more previously encoded and decoded pictures, i.e., reference pictures.

The motion estimation component 1920 provides motion data information to the motion compensation component 1922 and the entropy coding component 1936. More specifically, the motion estimation component 1920 performs tests on CUs in an LCU based on multiple inter-prediction modes (e.g., skip mode, merge mode, and normal or direct inter-prediction), PU sizes, and TU sizes using reference picture data from storage 1918 to choose the best CU partitioning, PU/TU partitioning, inter-prediction modes, motion vectors, etc. based on coding cost, e.g., a rate distortion coding cost. To perform the tests, the motion estimation component 1920 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 1920 provides the motion vector (MV) or vectors and the prediction mode for each PU in the selected CU partitioning to the motion compensation component (MC) 1922.

The motion compensation component 1922 receives the selected inter-prediction mode and mode-related information from the motion estimation component 1920 and generates the inter-predicted CUs. The inter-predicted CUs are provided to the mode decision component 1928 along with the selected inter-prediction modes for the inter-predicted PUs and corresponding TU sizes for the selected CU/PU/TU partitioning. The coding costs of the inter-predicted CUs are also provided to the mode decision component 1928.

The intra-prediction estimation component 1924 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 1924 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 1924 provides the selected intra-prediction modes for the PUs, and the corresponding TU sizes for the selected CU partitioning to the intra-prediction component (IP) 1926. The coding costs of the intra-predicted CUs are also provided to the intra-prediction component 1926.

The intra-prediction component 1926 (IP) receives intra-prediction information, e.g., the selected mode or modes for the PU(s), the PU size, etc., from the intra-prediction estimation component 1924 and generates the intra-predicted CUs. The intra-predicted CUs are provided to the mode decision component 1928 along with the selected intra-prediction modes for the intra-predicted PUs and corresponding TU sizes for the selected CU/PU/TU partitioning. The coding costs of the intra-predicted CUs are also provided to the mode decision component 1928.

The mode decision component 1928 selects between intra-prediction of a CU and inter-prediction of a CU based on the intra-prediction coding cost of the CU from the intra-prediction component 1926, the inter-prediction coding cost of the CU from the motion compensation component 1922, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 1936.

The output of the mode decision component 1928, i.e., the predicted PUs, is provided to a negative input of the combiner 1902 and to the combiner 1938. The associated transform unit size is also provided to the transform component 1904. The combiner 1902 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 1904 performs block transforms on the residual CUs to convert the residual pixel values to transform coefficients and provides the transform coefficients to a quantize component 1906. More specifically, the transform component 1904 receives the transform unit sizes for the residual CU and applies transforms of the specified sizes to the CU to generate transform coefficients. The transform component 1904 may perform the transform computations using a unified forward and inverse transform architecture as described herein. Further, the quantize component 1906 quantizes the transform coefficients based on quantization parameters (QPs) and quantization matrices provided by the coding control component and the transform sizes and provides the quantized transform coefficients to the entropy coding component 1936 for coding in the bit stream.

The entropy coding component 1936 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, flags indicating the CU/PU/TU partitioning of an LCU, the prediction modes for the CUs, and the quantized transform coefficients for the CUs. The entropy coding component 1936 also codes relevant data such as ALF parameters, e.g., filter type, on/off flags, and filter coefficients, and SAO parameters, e.g., filter type, on/off flags, and offsets as needed.

The LCU processing component 1942 includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 1912, which outputs a reconstructed version of the transform result from the transform component 1904. The dequantized transform coefficients are provided to the inverse transform component (IDCT) 1914, which outputs estimated residual information representing a reconstructed version of a residual CU. The inverse transform component 1914 receives the transform unit size used to generate the transform coefficients and applies inverse transform(s) of the specified size to the transform coefficients to reconstruct the residual values. The inverse transform component 1914 may perform the inverse transform computations using the same unified forward and inverse transform architecture as the transform component 1904. The reconstructed residual CU is provided to the combiner 1938.

The combiner 1938 adds the original predicted CU to the residual CU to generate a reconstructed CU, which becomes part of reconstructed picture data. The reconstructed picture data is stored in a buffer (not shown) for use by the intra-prediction estimation component 1924.

Various in-loop filters may be applied to the reconstructed picture data to improve the quality of the reference picture data used for encoding/decoding of subsequent pictures. The in-loop filters may include a deblocking filter 1930, a sample adaptive offset filter (SAO) 1932, and an adaptive loop filter (ALF) 1934. In some embodiments, the ALF 1934 may not be present. The in-loop filters 1930, 1932, 1934 are applied to each reconstructed LCU in the picture and the final filtered reference picture data is provided to the storage component 1918.

Figure 20:
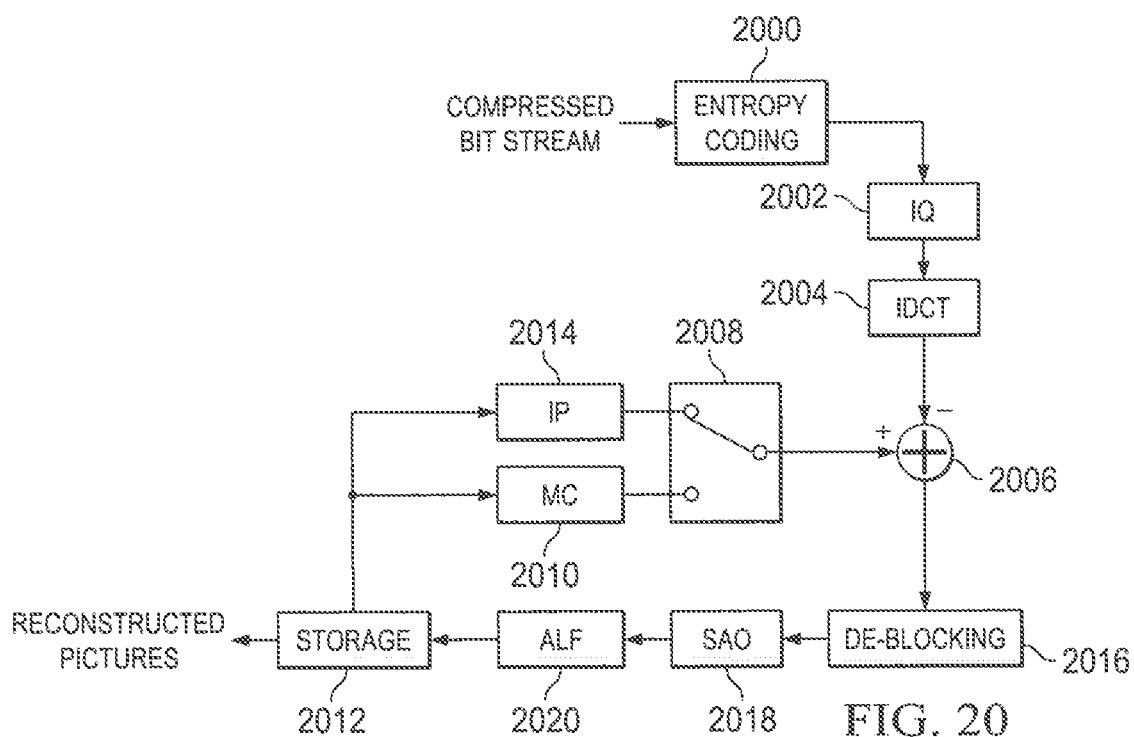
FIG. 20 is a block diagram of a video decoder.

FIG. 20 is a block diagram of an example video decoder. The entropy decoding component 2000 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, lossless coding flags (if present), etc. The decoded syntax elements are passed to the various components of the decoder as needed. For example, decoded prediction modes are provided to the intra-prediction component (IP) 2014 or motion compensation component (MC) 2010. If the decoded prediction mode is an inter-prediction mode, the entropy decoder 2000 reconstructs the motion vector(s) as needed and provides the motion vector(s) to the motion compensation component 2010.

The inverse quantize component (IQ) 2002 de-quantizes the quantized transform coefficients of the CUs. The inverse transform component 2004 transforms the frequency domain data from the inverse quantize component 2002 back to the residual CUs. That is, the inverse transform component 2004 applies an inverse unit transform, i.e., the inverse of the unit transform used for encoding, to the de-quantized residual coefficients to produce reconstructed residual values of the CUs. The inverse transform component 2004 may perform the inverse transform computations using the same unified forward and inverse transform architecture as the transform component 1904 and the inverse transform component 1914 of the video encoder.

A residual CU supplies one input of the addition component 2006. The other input of the addition component 2006 comes from the mode switch 2008. When an inter-prediction mode is signaled in the encoded video stream, the mode switch 2008 selects predicted PUs from the motion compensation component 2010 and when an intra-prediction mode is signaled, the mode switch selects predicted PUs from the intra-prediction component 2014.

The motion compensation component 2010 receives reference data from the storage component 2012 and applies the motion compensation computed by the encoder and transmitted in the encoded video bit stream to the reference data to generate a predicted PU. That is, the motion compensation component 2010 uses the motion vector(s) from the entropy decoder 2000 and the reference data to generate a predicted PU.

The intra-prediction component 2014 receives reconstructed samples from previously reconstructed PUs of a current picture from the storage component 2012 and performs the intra-prediction computed by the encoder as signaled by an intra-prediction mode transmitted in the encoded video bit stream using the reconstructed samples as needed to generate a predicted PU.

The addition component 2006 generates a reconstructed CU by adding the predicted PUs selected by the mode switch 2008 and the residual CU. The output of the addition component 2006, i.e., the reconstructed CUs, is stored in the storage component 2012 for use by the intra-prediction component 2014.

In-loop filters may be applied to reconstructed picture data to improve the quality of the decoded pictures and the quality of the reference picture data used for decoding of subsequent pictures. The in-loop filters are the same as those of the encoder, i.e., a deblocking filter 2016, a sample adaptive offset filter (SAO) 2018, and an adaptive loop filter (ALF) 2020. In some embodiments, the ALF 2020 may not be present. The in-loop filters may be applied on an LCU-by-LCU basis and the final filtered reference picture data is provided to the storage component 2012.

Figure 21:
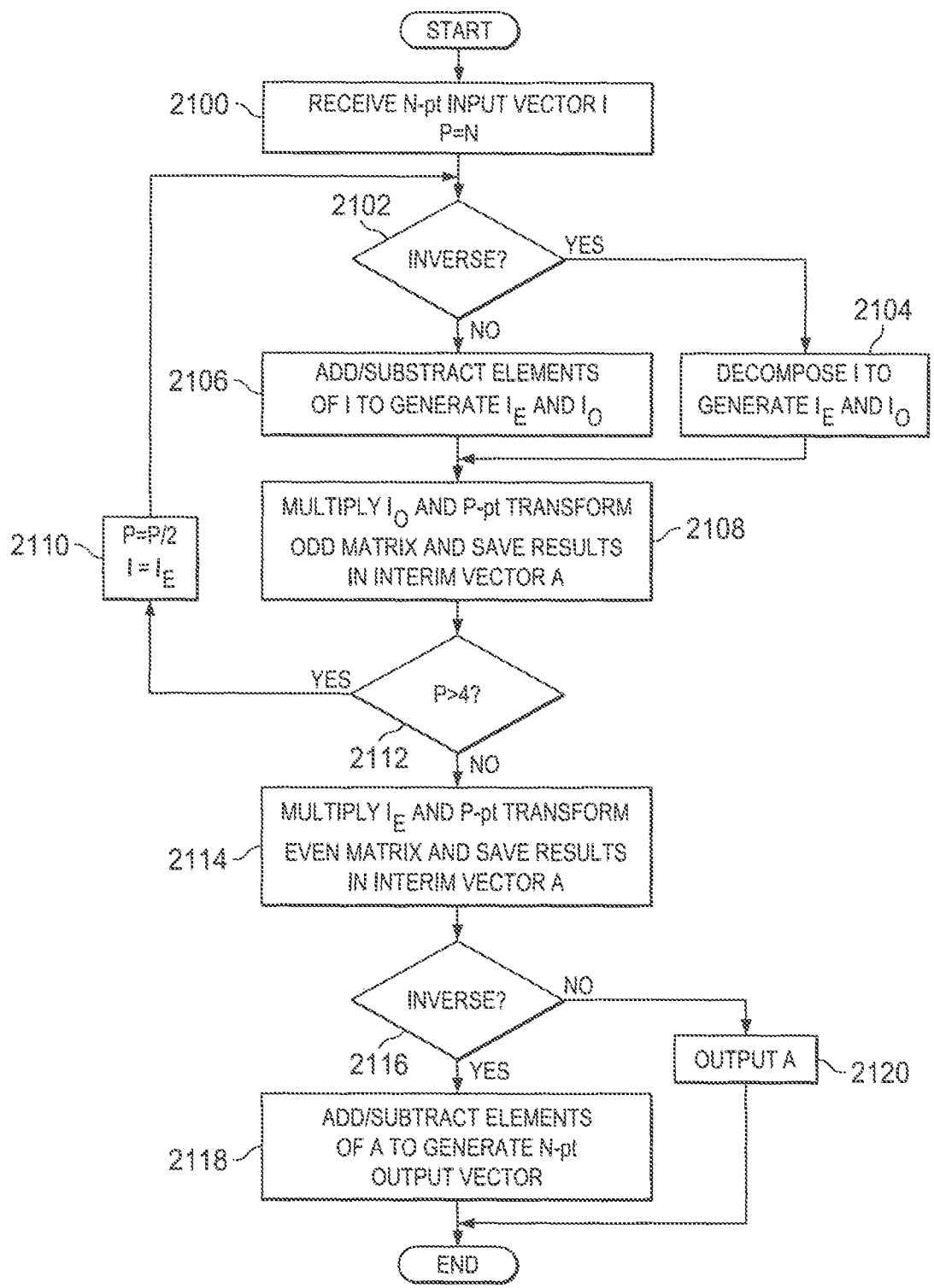
FIG. 21 is a flow diagram of a method.

FIG. 21 is a flow diagram of a method for unified computation of forward and inverse N-pt transforms. Initially, an N-pt input vector I is received 2100 and the variable P is set to the value of N. If computation of an inverse transform is indicated 2102, the input vector I is decomposed into two vectors $I_E$ and $I_O$ where the even elements of I form the elements of $I_E$ and the odd elements of I form the elements of $I_O$. If computation of a forward transform is indicated 2102, the elements of I are added/subtracted 2106 to generate an intermediate P-pt multiplicand vector. The intermediate P-pt multiplicand vector is decomposed into two vectors $I_E$ and $I_O$ where first P/2 elements of the intermediate multiplicand vector form the elements of $I_E$ and the second P/2 elements of the intermediate multiplicand vector form the elements of $I_O$.

Matrix multiplication is then performed to multiply $I_O$ and the P-pt transform odd matrix. As previously described herein, the P-pt transform odd matrix may be the same for both the forward and inverse P-pt transform computations with some sign differences. The sign differences may be handled as previously described herein. The results of this matrix multiplication are saved in an interim N-pt vector A. The particular outputs generated by this matrix multiplication for each transform size and their mapping to positions in the output vector for forward transforms are previously described herein in reference to FIG. 16 and for inverse transforms are previously described herein in reference to FIG. 17.

If P is greater than 4 2112, then P is set to P divided by 2, I is set to $I_E$, and 2102-2108 is repeated. Steps 2102-2110 are repeated until P is equal to 4.

When P is equal to 4 2112, matrix multiplication is then performed 2114 to multiply $I_E$ and the P-pt transform even matrix. The results of this matrix multiplication are saved in the interim vector A. The particular outputs generated by this matrix multiplication for a 4-pt transform computation and their mapping to positions in the output vector for forward transforms are previously described herein in reference to FIG. 16 and for inverse transforms are previously described herein in reference to FIG. 17. If the computation is of an N-pt inverse transform 2116, the elements of A are added/subtracted 2118 to generate the N-pt output vector. Otherwise, the interim vector A is the N-pt output vector 2120.

The unified forward and inverse transform architecture as per FIG. 15 was implemented using Verilog for a throughput of one 32-pt 1D transform per cycle. A 32×32 2D transform requires 64 cycles. Separate forward and inverse transforms were also implemented. The implementations were synthesized in 45-nm CMOS. Table 1 lists the area estimates (in kgates) at 250 MHz for the separate and unified implementations. The unified forward and inverse transform implementation requires around 44% less area than the separate forward transform and inverse transform implementations. The hardware area savings at other frequencies were in the range of 43-45%.

TABLE 1

| Freq | Fwd | Inv | Separate Fwd + Inv | Unified Fwd + Inv | % Area savings |
|---|---|---|---|---|---|
| 250 | 148 | 130 | 278 | 156 | 44% |

Table 2 provides the area breakdown of different components of the 32-pt unified forward and inverse transform implementation. As described herein, an N-pt transform implementation includes three primary components: N/2-pt transform logic, N-pt odd matrix multiplication logic, addition/subtraction logic for N inputs for the forward transform, and addition/subtraction logic for N outputs for the inverse transform. Hence smaller size transforms do not need separate implementation leading to area savings. In this table, the area for each AddSub<N> is for two sets of addition/subtraction logic.

TABLE 2

| 32-pt | 16-Pt | 8-pt | 4-pt | | % Area |
|---|---|---|---|---|---|
| | | | | Even4 | 0.2 |
| | | | | Odd4 | 1.0 |
| | | | | AddSub4 | 0.8 |
| | | | | Odd8 | 5.7 |
| | | | | AddSub8 | 1.8 |
| | | | | Odd16 | 16.9 |
| | | | | AddSub16 | 3.2 |
| | | | | Odd32 | 54.0 |
| | | | | AddSub32 | 6.1 |
| Mux, Demux, Rounding | | | | | 10.3 |
| | | | Total | | 100 |

Table 3 summarizes the hardware sharing between forward and inverse transforms that enables an area reduction of over 40%.

TABLE 3

| | Shared | Not-shared |
|---|---|---|
| 4-pt | Even4 matrix multiplication<br>Odd4 matrix multiplication | AddSub4 logic |
| 8-pt | Even4 matrix multiplication<br>Odd4 matrix multiplication<br>Odd8 matrix multiplication | AddSub8 logic |
| 16-pt | Even4 matrix multiplication<br>Odd4 matrix multiplication<br>Odd8 matrix multiplication<br>Odd16 matrix multiplication | AddSub16 logic |
| 32-pt | Even4 matrix multiplication<br>Odd4 matrix multiplication<br>Odd8 matrix multiplication<br>Odd16 matrix multiplication<br>Odd32 matrix multiplication | AddSub32 logic |

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described for the HEVC core transform. One of ordinary skill in the art will understand embodiments for transforms that have similar symmetry properties to the HEVC core transform. Further, one of ordinary skill in the art will understand embodiments for transforms larger than a 32-pt transform.

In some embodiments, the values of the transforms coefficients may be hardwired for each of the matrix multiplication blocks. In some embodiments, the values of the transform coefficients may be programmable for each of the matrix multiplication blocks.

In some embodiments, the 4/×4 forward and inverse transform computation may be implemented separately. In such embodiments, the unified forward and inverse 8-pt transform architecture (see FIG. 13) would not compute the even matrix multiplication via the unified 4-pt transform architecture. Instead, the unified 4-pt block of FIG. 13 would be replaced with an Even4 multiplication circuit that implements matrix multiplication with the even matrix of 8-pt forward transform.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A video decoding method comprising:
receiving encoded video data from a communications channel, the encoded video data comprising transform coefficients and prediction modes for a plurality of coding units;
decomposing an input vector of the transform coefficients for a coding unit in the encoded video data into an even vector and an odd vector, the input vector having a size N>4;
performing matrix multiplication of the odd vector with an odd transform matrix consisting of elements from a first set of rows of an N-point transform coefficient matrix; and
performing matrix multiplication of the even vector with an even transform matrix consisting of elements from a second set of rows of the N-point transform coefficient matrix by:
decomposing the even vector into a second even vector and a second odd vector;
performing matrix multiplication of the second odd vector with an odd transform matrix consisting of elements from a first set of rows of an N/2-point transform coefficient matrix; and performing matrix multiplication of the second even vector with an even transform matrix consisting of elements from a second set of rows of the N/2-point transform coefficient matrix;

determining reconstructed residual values for the coding unit based on the matrix-multiplied odd vector and the matrix-multiplied even vector; and combining the reconstructed residual values for the coding unit with a prediction unit corresponding to the prediction mode for the coding unit, to produce a reconstructed coding unit of a displayable image.

2. The method of claim 1, wherein determining reconstructed residual values for the coding unit based on the matrix-multiplied odd vector and the matrix-multiplied even vector comprises selectively adding and subtracting elements of the matrix-multiplied odd vector and the matrix-multiplied even vector.

3. The method of claim 1, wherein decomposing the input vector to an even vector and an odd vector comprises:
selecting even-numbered elements of the input vector to form the even vector; and
selecting odd-numbered elements of the input vector to form the odd vector;
and wherein decomposing the even vector to a second even vector and a second odd vector comprises:
selecting even-numbered elements of the even vector to form a second even vector; and
selecting odd-numbered elements of the even vector to form a second odd vector.

4. A video decoding system comprising:
a receiver configured to receive encoded video data from a communications channel;
a decoder coupled to the receiver configured to:
decompose an input vector of the encoded video data into an even vector and an odd vector, the input vector having a size N>4;
perform matrix multiplication of the odd vector with an odd transform matrix consisting of elements from a first set of rows of an N-point transform coefficient matrix;
perform matrix multiplication of the even vector with an even transform matrix consisting of elements from a second set of rows of the N-point transform coefficient matrix by a plurality of operations comprising:
decomposing the even vector into a second even vector and a second odd vector;
performing matrix multiplication of the second odd vector with an odd transform matrix consisting of elements from a first set of rows of an N/2-point transform coefficient matrix; and
performing matrix multiplication of the second even vector with an even transform matrix consisting of elements from a second set of rows of the N/2-point transform coefficient matrix; and
determine an output vector based on the matrix-multiplied odd vector and the matrix-multiplied even vector; and
produce a reconstructed coding unit of a displayable image based on the output vector; and
a display, coupled to the decoder, for displaying the displayable image from the reconstructed coding unit.

5. The system of claim 4, wherein determining an output vector based on the matrix-multiplied odd vector and the matrix-multiplied even vector comprises selectively adding and subtracting elements of the matrix-multiplied odd vector and the matrix-multiplied even vector.

6. The system of claim 4, wherein decomposing the input vector to an even vector and an odd vector comprises:
selecting even-numbered elements of the input vector to form the even vector; and
selecting odd-numbered elements of the input vector to form the odd vector;
and wherein the operation of decomposing the even vector to a second even vector and a second odd vector comprises:
selecting even-numbered elements of the even vector to form a second even vector; and
selecting odd-numbered elements of the even vector to form a second odd vector.

7. The system of claim 4, wherein the input vector has a size N>8; and wherein the decoder is configured to perform matrix multiplication of the second even vector by a plurality of operations comprising:
decomposing the second even vector into a third even vector and a third odd vector; and
performing matrix multiplication of the third odd vector with an odd transform matrix consisting of elements from a first set of rows of an N/4-point transform coefficient matrix; and
performing matrix multiplication of the third even vector with an even transform matrix consisting of elements from a second set of rows of the N/4-point transform coefficient matrix.

8. The system of claim 4, wherein the input vector has a size N>8;
wherein the decoder is configured to perform matrix multiplication of the second even vector by a plurality of operations:
initializing a variable P=N/4;
decomposing the second even vector into a third even vector and a third odd vector;
performing matrix multiplication of the third odd vector with an odd transform matrix consisting of elements from a first set of rows of a P-point transform coefficient matrix;
if P=4, performing matrix multiplication of the third even vector with an even transform matrix consisting of elements from a second set of rows of a P-point transform coefficient matrix; and
if P>4, setting P=P/2 and repeating the operations of selecting even-numbered and odd-numbered elements and performing matrix multiplications.

9. The method of claim 1, wherein the input vector has a size N>8; and wherein the step of performing matrix multiplication of the second even vector comprises:
decomposing the second even vector into a third even vector and a third odd vector; and
performing matrix multiplication of the third odd vector with an odd transform matrix consisting of elements from a first set of rows of an N/4-point transform coefficient matrix; and
performing matrix multiplication of the third even vector with an even transform matrix consisting of elements from a second set of rows of the N/4-point transform coefficient matrix.

10. The method of claim 1, wherein the input vector has a size N>8;
   wherein the step of performing matrix multiplication of the second even vector comprises:
      initializing a variable P=N/4;
      decomposing the second even vector into a third even vector and a third odd vector;
   performing matrix multiplication of the third odd vector with an odd transform matrix consisting of elements from a first set of rows of a P-point transform coefficient matrix;
      if P=4, performing matrix multiplication of the third even vector with an even transform matrix consisting of elements from a second set of rows of a P-point transform coefficient matrix; and
      if P>4, repeating the operations of selecting even-numbered and odd-numbered elements and performing matrix multiplications for P=P/2 until P=4.

11. The method of claim 1, further comprising:
   displaying the displayable image from the reconstructed coding unit by a light emitting diode display.

12. The method of claim 1, wherein the encoded video data further comprises motion vectors for one or more of the plurality of coding units associated with an inter-prediction mode; and wherein the combining step comprises:
   responsive to the prediction mode for the coding unit being the inter-prediction mode, combining the reconstructed residual values for the coding unit with a prediction unit generated from motion vectors for the coding unit received in the encoded video data; and
   responsive to the prediction mode for the coding unit being an intra-prediction mode, combining the reconstructed residual values for the coding unit with a prediction unit generated from intra-prediction using reconstructed samples from previously reconstructed prediction units of a picture including the coding unit.

13. A video decoding system comprising:
   a receiver configured to receive encoded video data from a communications channel, the encoded video data comprising transform coefficients and prediction modes for a plurality of coding units, and motion vectors for one or more of the plurality of coding units; and
   a decoder coupled to the receiver, comprising:
      an inverse transform component configured to:
         decompose an input vector of the encoded video data into an even vector and an odd vector, the input vector having a size N>4;
         perform matrix multiplication of the odd vector with an odd transform matrix consisting of elements from a first set of rows of an N-point transform coefficient matrix;
         perform matrix multiplication of the even vector with an even transform matrix consisting of elements from a second set of rows of the N-point transform coefficient matrix by a plurality of operations comprising:
            decomposing the even vector into a second even vector and a second odd vector;
            performing matrix multiplication of the second odd vector with an odd transform matrix consisting of elements from a first set of rows of an N/2-point transform coefficient matrix; and
            performing matrix multiplication of the second even vector with an even transform matrix consisting of elements from a second set of rows of the N/2-point transform coefficient matrix; and
         determine reconstructed residual values for the coding unit based on the matrix-multiplied odd vector and the matrix-multiplied even vector;
      a motion compensation component configured to generate a prediction unit for coding units having an inter-prediction mode, using motion vectors received in the encoded video data;
      an intra-prediction component configured to generate a prediction unit for coding units having an intra-prediction mode; and
      an addition component configured to combine the reconstructed residual values for the coding unit with a prediction unit from the motion compensation component or intra-prediction component according to the prediction mode for the coding unit, to produce a reconstructed coding unit of a displayable image.

14. The system of claim 13, wherein determining reconstructed residual values for the coding unit based on the matrix-multiplied odd vector and the matrix-multiplied even vector comprises selectively adding and subtracting elements of the matrix-multiplied odd vector and the matrix-multiplied even vector.

15. The system of claim 13, wherein decomposing the input vector to an even vector and an odd vector comprises:
   selecting even-numbered elements of the input vector to form the even vector; and
   selecting odd-numbered elements of the input vector to form the odd vector;
   and wherein the operation of decomposing the even vector to a second even vector and a second odd vector comprises:
      selecting even-numbered elements of the even vector to form a second even vector; and
      selecting odd-numbered elements of the even vector to form a second odd vector.

16. The system of claim 13, wherein the input vector has a size N>8;
   and wherein the decoder is configured to perform matrix multiplication of the second even vector by a plurality of operations comprising:
      decomposing the second even vector into a third even vector and a third odd vector; and
      performing matrix multiplication of the third odd vector with an odd transform matrix consisting of elements from a first set of rows of an N/4-point transform coefficient matrix; and
      performing matrix multiplication of the third even vector with an even transform matrix consisting of elements from a second set of rows of the N/4-point transform coefficient matrix.

17. The system of claim 13, wherein the input vector has a size N>8;
   wherein the decoder is configured to perform matrix multiplication of the second even vector by a plurality of operations:
      initializing a variable P=N/4;
      decomposing the second even vector into a third even vector and a third odd vector;
      performing matrix multiplication of the third odd vector with an odd transform matrix consisting of elements from a first set of rows of a P-point transform coefficient matrix;
      if P=4, performing matrix multiplication of the third even vector with an even transform matrix consisting of elements from a second set of rows of a P-point transform coefficient matrix; and if P>4, setting P=P/2 and repeating the operations of selecting even-numbered and odd-numbered elements and performing matrix multiplications.

18. The system of claim 13, further comprising:

a light emitting diode display, coupled to the decoder, for displaying the displayable image from the reconstructed coding unit.

19. The system of claim 13, further comprising a liquid crystal display, coupled to the decoder, for displaying the displayable image from the reconstructed coding unit.

20. The method of claim 1, further comprising displaying the displayable image from the reconstructed coding unit by a liquid crystal display.

* * * * *